(12) United States Patent (10) Patent No.: US 8,288,704 B2
Perlman et al. (45) Date of Patent: *Oct. 16, 2012

(54) APPARATUS AND METHOD FOR CAPTURING STILL IMAGES AND VIDEO USING CODED LENS IMAGING TECHNIQUES

(75) Inventors: Stephen G. Perlman, Palo Alto, CA (US); Axel Busboom, Unterleinleiter (DE); Pamela Greene, Santa Clara, CA (US); Tim S. Cotter, Sunnyvale, CA (US); John Speck, Sunnyvale, CA (US); Roger van der Laan, Los Altos, CA (US)

(73) Assignee: Rearden, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,461

(22) Filed: Sep. 6, 2011

(65) Prior Publication Data

US 2011/0315855 A1 Dec. 29, 2011

Related U.S. Application Data

(63) Continuation of application No. 12/691,500, filed on Jan. 21, 2010, now Pat. No. 8,013,285, which is a continuation of application No. 11/210,098, filed on Aug. 22, 2005.

(60) Provisional application No. 60/701,435, filed on Jul. 20, 2005.

(51) Int. Cl.
*H01L 27/00* (2006.01)
*G01T 1/161* (2006.01)
*H01J 3/14* (2006.01)

(52) U.S. Cl. .............. 250/216; 250/208.1; 250/363.06
(58) Field of Classification Search ............ 250/216, 250/208.1, 363.06
See application file for complete search history.

(56) References Cited

U.S. PATENT DOCUMENTS

| | | | |
|---|---|---|---|
| 4,209,780 | A | 6/1980 | Fenimore et al. |
| 4,855,061 | A | 8/1989 | Martin |
| 5,424,533 | A | 6/1995 | Schmutz et al. |
| 5,479,026 | A | 12/1995 | Schumtz et al. |
| 5,756,026 | A | 5/1998 | Sanchez et al. |

(Continued)

FOREIGN PATENT DOCUMENTS

JP 05-333398 12/1993

(Continued)

OTHER PUBLICATIONS

Office Action from U.S. Appl. No. 11/210,098, mailed Aug. 21, 2008, 10 pgs.

(Continued)

*Primary Examiner* — Thanh Luu
(74) *Attorney, Agent, or Firm* — Blakely Sokoloff Taylor & Zafman LLP

(57) ABSTRACT

An apparatus for capturing images. In one embodiment, the apparatus comprises: a coded lens array including a plurality of lenses arranged in a coded pattern and with opaque material blocking array elements that do not contain lenses; and a light-sensitive semiconductor sensor coupled to the coded lens array and positioned at a specified distance behind the coded lens array, the light-sensitive sensor configured to sense light transmitted through the lenses in the coded lens array.

17 Claims, 23 Drawing Sheets

U.S. PATENT DOCUMENTS

| | | | |
|---|---|---|---|
| 5,757,005 A * | 5/1998 | Callas et al. | 250/363.06 |
| 6,141,104 A | 10/2000 | Schulz et al. | |
| 6,205,195 B1 | 3/2001 | Lanza | |
| 6,454,414 B1 | 9/2002 | Ting | |
| 6,643,386 B1 | 11/2003 | Foster | |
| 6,710,797 B1 | 3/2004 | McNelley et al. | |
| 6,737,652 B2 | 5/2004 | Lanza et al. | |
| 2003/0193599 A1 | 10/2003 | Campbell et al. | |
| 2005/0119868 A1 | 6/2005 | Scheidemann et al. | |

FOREIGN PATENT DOCUMENTS

| | | |
|---|---|---|
| JP | 2000503393 | 3/2000 |

OTHER PUBLICATIONS

Office Action from U.S. Appl. No. 11/210,098, mailed Mar. 31, 2008, 8 pgs.

Office Action from U.S. Appl. No. 11/210,098, mailed Jan. 29, 2007, 9 pgs.

Office Action from U.S. Appl. No. 11/210,098, mailed Jun. 22, 2006, 8 pgs.

Office Action from U.S. Appl. No. 11/899,814, mailed Jul. 29, 2008, 8 pgs.

Office Action from U.S. Appl. No. 11/899,814, mailed Mar. 7, 2008, 13 pgs.

Notification of Transmittal of the International Search Report and the Written Opinion of the International Searching Authority, or the Declaration from Counterpart PCT Patent No. PCT/US06/01111, dated Aug. 3, 2006, 13 pgs.

Notification Concerning Transmittal of International Preliminary Report on Patentability (Chapter I of the Patent Cooperation Treaty) and Written Opinion of the International Searching Authority from Counterpart PCT Patent No. PCT/US06/01111, mailed Jul. 24, 2007, 9 pgs.

Office Action from U.S. Appl. No. 11/210,098, mailed Jan. 13, 2009, 6 pgs.

Issue Fee from U.S. Appl. No. 11/210,098, mailed Oct. 21, 2009, 10 pgs.

Office Action from U.S. Appl. No. 11/039,029, mailed Nov. 6, 2008, 7 pgs.

Office Action from U.S. Appl. No. 11/039,029, mailed Mar. 17, 2008, 9 pgs.

Office Action from U.S. Appl. No. 11/039,029, mailed Nov. 6, 2007, 11 pgs.

Office Action from U.S. Appl. No. 11/039,029, mailed Apr. 12, 2007, 5 pgs.

Office Action from U.S. Appl. No. 11/039,029, mailed Dec. 15, 2006, 10 pgs.

Office Action from U.S. Appl. No. 11/039,029, mailed Jun. 27, 2006, 9 pgs.

Office Action from U.S. Appl. No. 11/899,814, mailed Mar. 3, 2009, 8 pgs.

Office Action from U.S. Appl. No. 11/039,029, mailed Mar. 3, 2009, 9 pgs.

Office Action from U.S. Appl. No. 11/899,814, mailed Aug. 17, 2009, 10 pgs.

"Coded Aperture Imaging", http://paulcarlisle.net/old/codedaperature.html, (Nov. 29, 1998), 1-6 pgs.

Dicke, R.N., "Scatter-Hole Cameras For X-Rays and Gamma Rays", The Astrophsical Journal, vol. 153, (Aug. 1968), L101-L106.

Fenimore, E. E., et al., "Coded Aperture Imaging with Uniformly Redundant Arrays", Applied Optics, vol. 17, No. 3, (Feb. 1, 1979), 337-347 pgs.

Fenimore, E. E., "Coded Aperture Imaging: Predicted Performance of Uniformly Redundant Arrays", Applied Optics, vol. 17, No. 22, (Nov. 15, 1978), 3562-3570 pgs.

Fenimore, E. E., et al., "Coded Aperture Imaging: The Modulation Transfer Function For Uniformly Redundant Arrays", Applied Optics, vol. 19, No. 14, (Jul. 15, 1980), 2465-2471 pgs.

Fenimore, E. E., et al., "Comparison of Fresnel Zone Plates and Uniformly Redundant Arrays", SPIE, Applications of Digital Image Processing, vol. 149, (Aug. 28-29, 1978), 232-236 pgs.

Fenimore, E. E., et al., "Fast Delta Hadamard Transform", Applied Optics, vol. 20, No. 17, (Sep. 1, 1981), 3058-3067 pgs.

Fenimore, E. E., "Large Symmetric Π Transformations for Hadamard Transforms", Applied Optics, vol. 22, No. 6, (Mar. 15, 1983), 826-829 pgs.

Fenimore, E. E., "Time-Resolved and Energy-Resolved Coded Aperture Images with URA Tagging", Applied Optics, vol. 26, No. 14, (Jul. 15, 1987), 2760-2769 pgs.

Fenimore, E.E., et al., "Tomographical Imaging Using Uniformly Redundant Arrays", Applied Optics, vol. 18, No. 7, (Apr. 1, 1979), 1052-1057 pgs.

Fenimore, E. E., et al., "Uniformly Redundant Array Imaging of Laser Driven Compressions: Preliminary Results", Applied Optics, vol. 18, No. 7, (Apr. 1, 1979), 945-947 pgs.

Fenimore, E. E., et al., "Uniformly Redundant Arrays", Digital Signal Processing Symposium,, (Dec. 6-7, 1977), 1-14 pgs.

Fenimore, E. E., et al., "Uniformly Redundant Arrays: Digital Reconstruction Methods", Applied Optics, vol. 20, No. 10, (May 15, 1981), 1858-1864 pgs.

Fenimore, E.E., "X-Ray Imaging Using Uniformaly Redundant Arrays", LASL 78 102, (Jan. 1979), 1-4 pgs.

Gottesman, Stephen, et al., "New Family of Binary Arrays For Coded Aperture imaging", Applied Optics, vol. 28, No. 20, (Oct. 15, 1989), 4344-4392, 9 pgs.

Gunson, J., et al., "Optimum Design Of A Coded Mask X-Ray Telescope For Rocket Applications", Mon. Not. R. astr. Soc. vol. 177, (1976), 485-497 pgs.

Hendriks, Benno, et al., "Through a Lens Sharply", IEEE Spectrum, (Dec. 2004), 32-26 pgs.

Renner, Eric, "Pinhole Photography", Recovering a Historic Technique, Second Edition, ISBN: 0-0240-8350-2, (2000), 1-5 pgs.

Issue Fee from U.S. Appl. No. 11/210,098, mailed Oct. 21, 2009, 10 pages.

Office Action from U.S. Appl. No. 12/691,500, mailed Aug. 23, 2010, 9 pages.

"Coded Aperture Imaging", http://paulcarlisle.net/old/codedaperature.html, (Nov. 29, 1998), 1-6 pages.

Notice of Allowance from U.S. Appl. No. 11/899,814, mailed Mar. 23, 2010, 5 pages.

* cited by examiner

Figure 1 (co-pending)

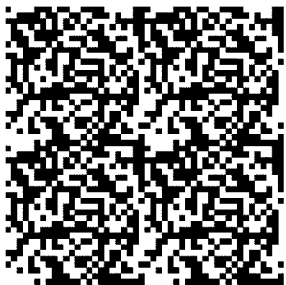
PBA 24 Pattern (enlarged)
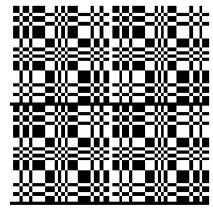
MURA 31 Pattern
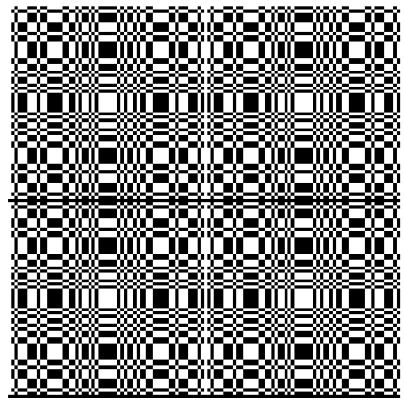
PBA 8 Pattern (enlarged)
MURA 61 Pattern
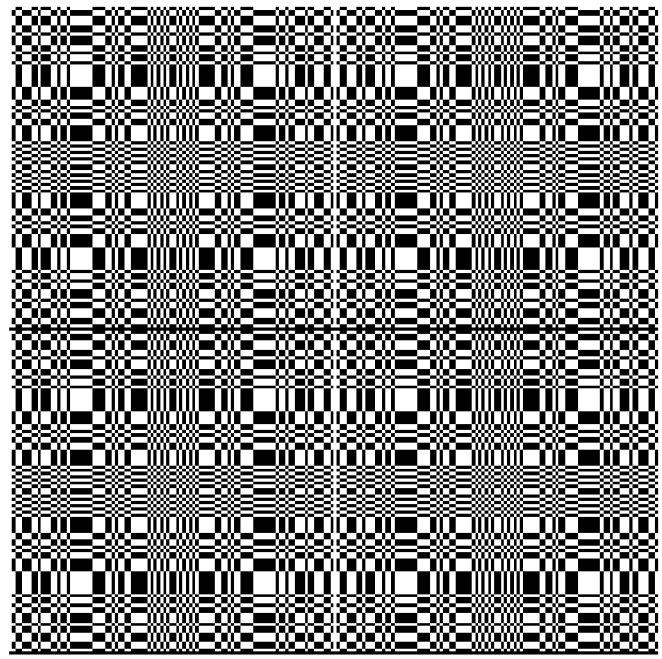
MURA 101 Pattern
Figure 2 (prior art)

Figure 3 (co-pending)

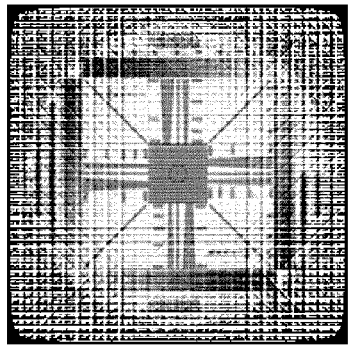
1801
range = 500 mm
stddev = 2,047
m/s = 0.0977
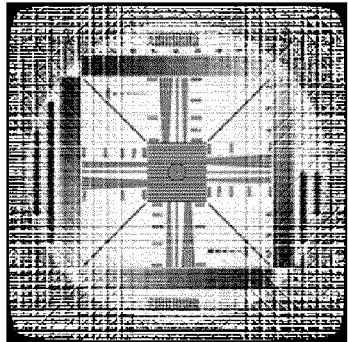
1802
range = 800 mm
stddev = 1,426
m/s = 0.1177
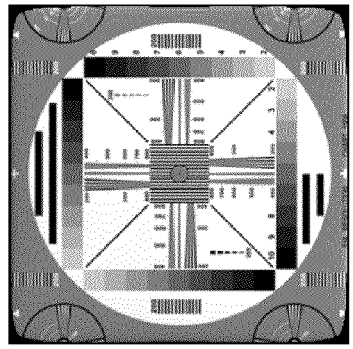
1803
range = 1,000 mm
stddev = 79.83
m/s = 2.0
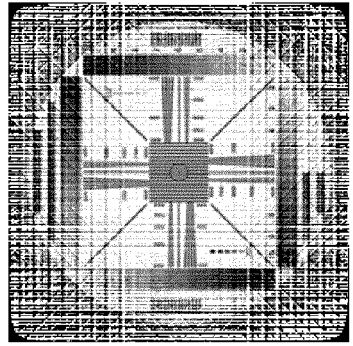
1804
range = 5,000 mm
stddev = 1,465
m/s = 0.1075
Figure 18

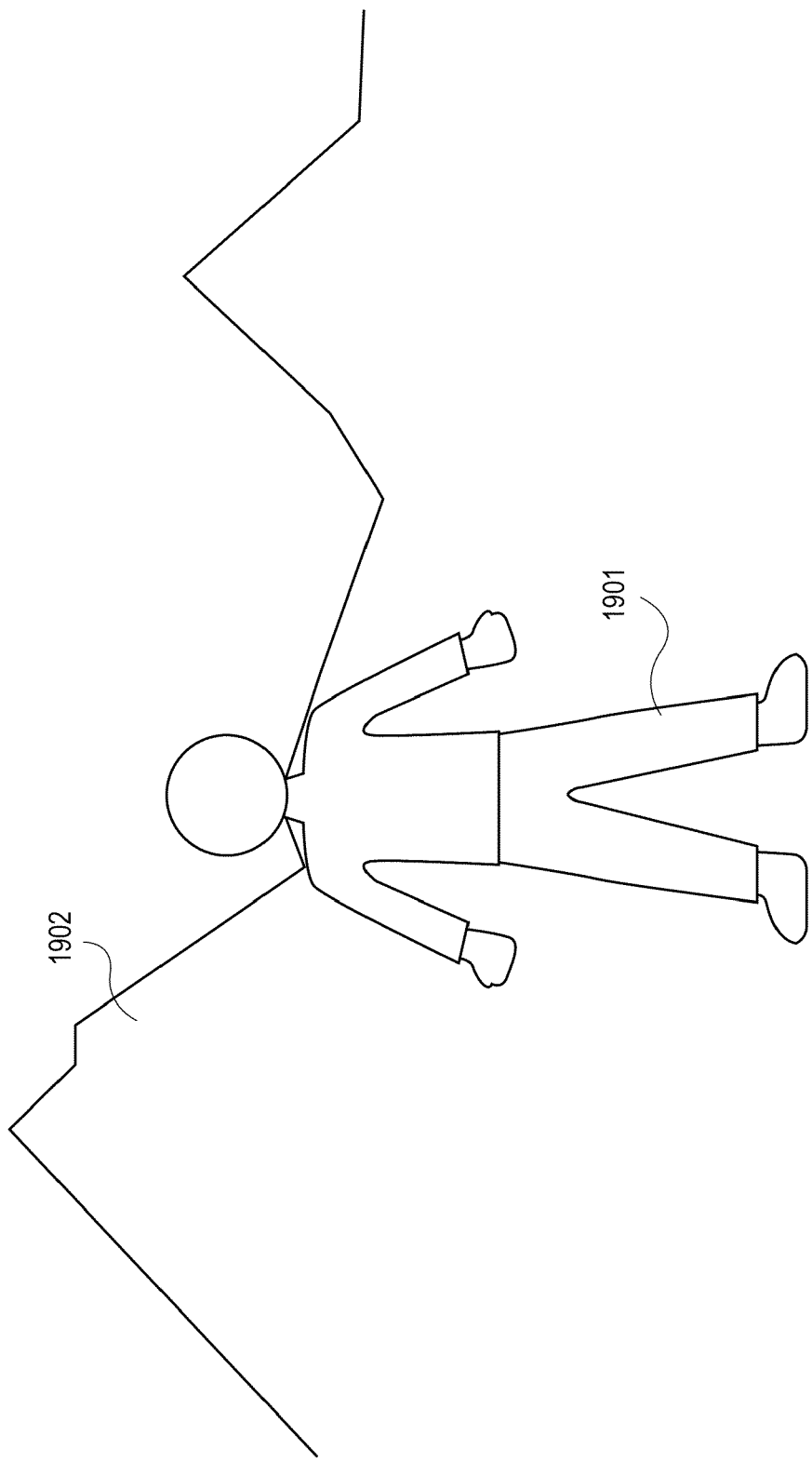

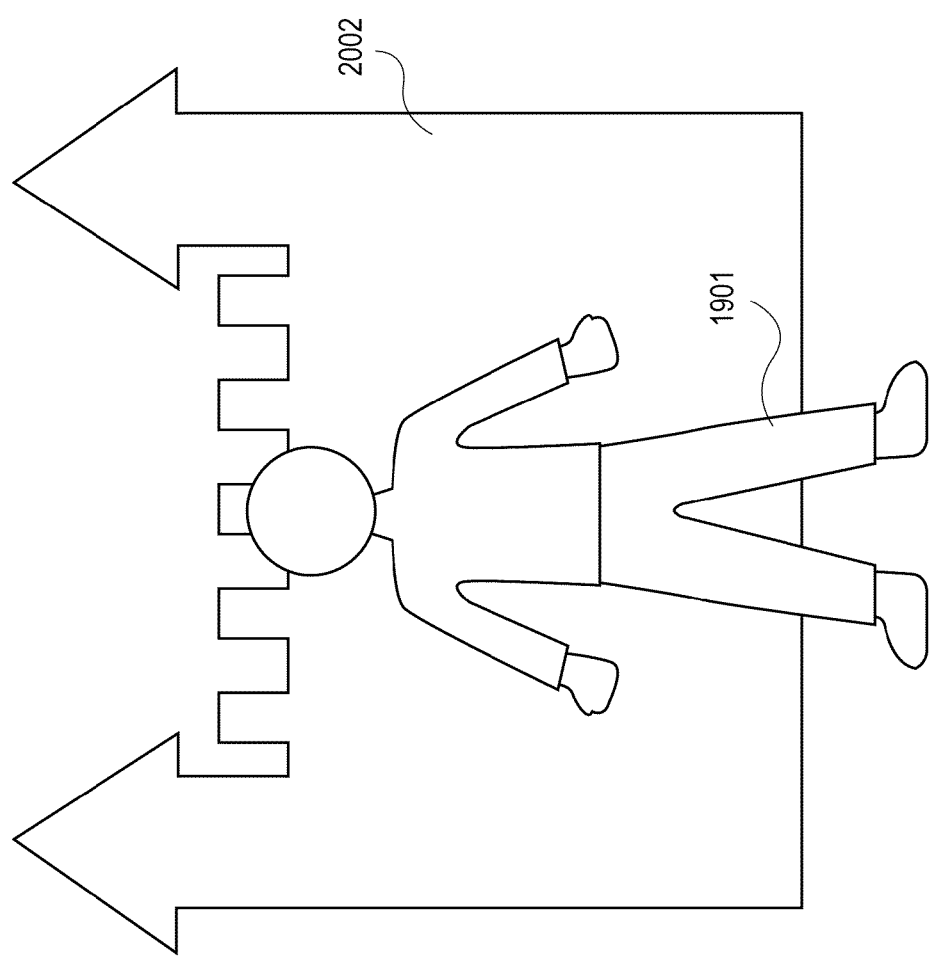

APPARATUS AND METHOD FOR CAPTURING STILL IMAGES AND VIDEO USING CODED LENS IMAGING TECHNIQUES

PRIORITY CLAIM

This application is a continuation of U.S. patent application Ser. No. 12/691,500, filed Jan. 21, 2010 now U.S. Pat. No. 8,013,285 which is a continuation of co-pending Continuation-in-Part U.S. patent application Ser. No. 11/210,098 entitled "Apparatus And Method For Capturing Still Images And Video Using Coded Lens Imaging Technique" filed on Aug. 22, 2005 and claims the benefit of co-pending U.S. patent application Ser. No. 11/039,029, entitled, "Apparatus And Method For Capturing Still Images And Video Using Coded Aperture Techniques" filed on Jan. 18, 2005 and claims the benefit of U.S. Provisional Application No. 60/701,435 entitled, "Apparatus And Method For Capturing Still Images And Video Using Coded Lens Imaging Techniques", filed on Jul. 20, 2005. This application is incorporated by reference in its entirety.

BACKGROUND OF THE INVENTION

1. Field of the Invention

This invention relates generally to the field of image capture and image processing. More particularly, the invention relates to an apparatus and method for capturing still images and video using coded lens techniques.

2. Description of the Related Art

Photographic imaging is commonly done by focusing the light coming from a scene using a single glass lens which is placed in front of a light sensitive detector such as a photographic film or a semiconductor sensor including CCD and CMOS sensors.

For imaging high-energy radiation such as x-ray or gamma rays, other techniques must be used because such radiation cannot be diffracted using glass lenses. A number of techniques have been proposed including single pinhole cameras and multi-hole collimator systems. A particularly beneficial technique is "coded aperture imaging" wherein a structured aperture, consisting of a suitably-chosen pattern of transparent and opaque elements, is placed in front of a detector sensitive to the radiation to be imaged. When the aperture pattern is suitably chosen, the imaged scene can be digitally reconstructed from the detector signal. Coded aperture imaging has the advantage of combining high spatial resolution with high light efficiency. Coded aperture imaging of x-ray and gamma ray radiation using structured arrays of rectangular or hexagonal elements is known from R. H. DICKE: SCATTER-HOLE CAMERA FOR X-RAYS AND GAMMA RAYS. ASTROHYS. J., 153:L101-L106, 1968 (hereinafter "Dicke"), and has been extensively applied in astronomical imaging and nuclear medicine.

A particularly useful class of coded imaging systems is known from E. E. FENIMORE AND T. M. CANNON: CODED APERTURE IMAGING WITH UNIFORMLY REDUNDANT ARRAYS. APPL. OPT., 17:337-347, 1978 (hereinafter "Fenimore"). In this class of systems, a basic aperture pattern is cyclically repeated such that the aperture pattern is a 2×2 mosaic of the basic pattern. The detector has at least the same size as the basic aperture pattern. In such a system, the "fully coded FOV" ("FOV" shall be used herein to refer to "field-of-view") is defined as the area within the FOV, within which a point source would cast a complete shadow of a cyclically shifted version of the basic aperture pattern onto the aperture. Likewise, the "partially coded FOV" is defined as the area within the FOV, within which a point source would only cast a partial shadow of the basic aperture pattern onto the aperture. According to Dicke, a collimator is placed in front of the detector which limits the FOV to the fully coded FOV, thus allowing an unambiguous reconstruction of the scene from the detector signal.

From J. GUNSON AND B. POLYCHRONOPULOS: OPTIMUM DESIGN OF A CODED MASK X-RAY TELESCOPE FOR ROCKET APPLICATIONS. MON. NOT. R. ASTRON. Soc., 177:485-497, 1976 (hereinafter "Gunson") it is further known to give the opaque elements of the aperture a finite thickness such that the aperture itself acts as a collimator and limits the FOV to the fully coded FOV. Such a "self-collimating aperture" allows the omission of a separate collimator in front of the detector.

It should be noted that besides limiting the FOV, a collimator has the undesired property of only transmitting light without attenuation which is exactly parallel to the optical axis. Any off-axis light passing through the collimator is attenuated, the attenuation increasing towards the limits of the FOV. At the limits of the FOV, the attenuation is 100%, i.e., no light can pass through the collimator at such angles. This effect will be denoted as "collimator attenuation" within this document. Both in the x-direction and in the y-direction, collimator attenuation is proportional to the tangent of the angle between the light and the optical axis.

After reconstructing an image from a sensor signal in a coded aperture imaging system, the effect of collimator attenuation may have to be reversed in order to obtain a photometrically correct image. This involves multiplying each individual pixel value with the inverse of the factor by which light coming from the direction which the pixel pertains to, has been attenuated. It should be noted that close to the limits of the FOV, the attenuation, especially the collimator attenuation, is very high, i.e. this factor approaches zero. Inverting the collimator attenuation in this case involves amplifying the pixel values with a very large factor, approaching infinity at the limits of the FOV. Since any noise in the reconstruction will also be amplified by this factor, pixels close to the limits of the FOV may be very noisy or even unusable.

In a coded aperture system according to Fenimore or Gunson, the basic aperture pattern can be characterized by means of an "aperture array" of zeros and ones wherein a one stands for a transparent and a zero stands for an opaque aperture element. Further, the scene within the FOV can be characterized as a two-dimensional array wherein each array element contains the light intensity emitted from a single pixel within the FOV. When the scene is at infinite distance from the aperture, it is known that the sensor signal can be characterized as the two-dimensional, periodic cross-correlation function between the FOV array and the aperture array. It should be noted that the sensor signal as such has no resemblance with the scene being imaged. However, a "reconstruction filter" can be designed by computing the two-dimensional periodic inverse filter pertaining to the aperture array. The two-dimensional periodic inverse filter is a two-dimensional array which is constructed in such a way that all sidelobes of the two-dimensional, periodic cross-correlation function of the aperture array and the inverse filter are zero. By computing the two-dimensional, periodic cross-correlation function of the sensor signal and the reconstruction filter, an image of the original scene can be reconstructed from the sensor signal.

It is known from Fenimore to use a so-called "Uniformly Redundant Arrays" (URAs) as aperture arrays. URAs have a two-dimensional, periodic cross-correlation function whose sidelobe values are all identical. URAs have an inverse filter which has the same structure as the URA itself, except for a constant offset and constant scaling factor. Such reconstruction filters are optimal in the sense that any noise in the sensor signal will be subject to the lowest possible amplification during the reconstruction filtering. However, URAs can be algebraically constructed only for very few sizes.

It is further known from S. R. GOTTESMAN AND E. E. FENIMORE: NEW FAMILY OF BINARY ARRAYS FOR CODED APERTURE IMAGING. APPL. OPT., 28:4344-4352, 1989 (hereinafter "Gottesman") to use a modified class of aperture arrays called "Modified Uniformly Redundant Arrays" (MURAs) which exist for all sizes p×p where p is an odd prime number. Hence, MURAs exist for many more sizes than URAs. Their correlation properties and noise amplification properties are near-optimal and almost as good as the properties of URAs. MURAs have the additional advantage that, with the exception of a single row and a single column, they can be represented as the product of two one-dimensional sequences, one being a function only of the column index and the other being a function only of the row index to the array. Likewise, with the exception of a single row and a single column, their inverse filter can also be represented as the product of two one-dimensional sequences. This property permits to replace the two-dimensional in-verse filtering by a sequence of two one-dimensional filtering operations, making the reconstruction process much more efficient to compute.

It is further known from A. BUSBOOM: ARRAYS UND REKONSTRUKTIONSALGORITHMEN FUER BILDGEBENDE SYSTEME MIT CODIERTER APERTUR. VDI VERLAG, DUESSELDORF, 1999, ISBN 3-18-357210-9 (hereinafter "Busboom") to use so-called "Perfect Binary Arrays" (PBAs) which exist for all sizes $3^s 2^r \times 3^s 2^r$ and all sizes $3^s 2^{r-1} \times 3^s 2^{r+1}$ where s=0, 1, 2 . . . and r=1, 2, 3 . . . . Hence, PBAs also exist for many sizes, especially for many square sizes with an even number of columns and rows. Their correlation properties and noise amplification properties are as good as those of URAs.

If the scene is at a finite distance from the aperture, a geometric magnification of the sensor image occurs. It should be noted that a point source in the scene would cast a shadow of the aperture pattern onto the sensor which is magnified by a factor of $f=(o+a)/o$ compared to the actual aperture size where o is the distance between the scene and the aperture and a is the distance between the aperture and the sensor. Therefore, if the scene is at a finite distance, the sensor image needs to be filtered with an accordingly magnified version of the reconstruction filter.

If the scene is very close to the aperture, so-called near-field effects occur. The "near field" is defined as those ranges which are less than 10 times the sensor size, aperture size or distance between aperture and sensor, whichever of these quantities is the largest. If an object is in the near field, the sensor image can no longer be described as the two-dimensional cross-correlation between the scene and the aperture array. This causes artifacts when attempting to reconstructing the scene using inverse filtering. In Lanza, et al., U.S. Pat. No. 6,737,652, methods for reducing such near-field artifacts are disclosed. These methods involve imaging the scene using two separate coded apertures where the second aperture array is the inverse of the first aperture array (i.e. transparent elements are replaced by opaque elements and vice versa). The reconstruction is then computed from two sensor signals acquired with the two different apertures in such a manner that near-field artifacts are reduced in the process of combining the two sensor images.

Coded aperture imaging to date has been limited to industrial, medical, and scientific applications, primarily with x-ray or gamma-ray radiation, and systems that have been developed to date are each designed to work within a specific, constrained environment. For one, existing coded aperture imaging systems are each designed with a specific view depth (e.g. effectively at infinity for astronomy, or a specific distance range for nuclear or x-ray imaging). Secondly, to date, coded aperture imaging has been used with either controlled radiation sources (e.g. in nuclear, x-ray, or industrial imaging), or astronomical radiation sources that are relatively stable and effectively at infinity. As a result, existing coded aperture systems have had the benefit of operating within constrained environments, quite unlike, for example, a typical photographic camera using a lens. A typical photographic camera using a single lens (i.e. a single lens per sensor or film frame; stereoscopic cameras have 2 lenses, but utilize a separate sensor or film frame per lens) is designed to simultaneously handle imaging of scenes containing 3-dimensional objects with varying distances from close distances to effective infinite distance; and is designed to image objects reflecting, diffusing, absorbing, refracting, or retro-reflecting multiple ambient radiation sources of unknown origin, angle, and vastly varying intensities. No coded aperture system has ever been designed that can handle these types of unconstrained imaging environments that billions of photographic cameras with single lenses handle everyday.

Photographic imaging in the optical spectrum using a single lens has a number of disadvantages and limitations. The main limitation of single lens photography is its finite depth-of-field (DOF), particularly at large aperture settings. Only scenes at a limited DOF can be in focus in a single lens image while any objects closer or farther away from the camera than the DOF will appear blurred in the image.

Further, a single lens camera must be manually or automatically focused before an image can be taken. This is a disadvantage when imaging objects which are moving fast or unexpectedly such as in sports photography or photography of children or animals, particularly at large apertures with a short DOF. In such situations, the images may be out of focus because there was not enough time to focus or because the object moved unexpectedly when acquiring the image. Single lens photography does not allow a photographer to retrospectively change the focus once an image has been acquired.

Still further, focusing a single lens camera involves adjusting the distance between one or more lenses and the sensor. This makes it necessary for a single lens camera to contain mechanically moving parts which makes it prone to mechanical failure. Various alternatives to glass lenses, such as liquid lenses (see, e.g., B. HENDRIKS & STEIN KUIPER: THROUGH A LENS SHARPLY. IEEE SPECTRUM, DECEMBER, 2004), have been proposed in an effort to mitigate the mechanical limitations of a glass lens, but despite the added design complexity and potential limitations (e.g., operating temperature range and aperture size) of such alternatives, they still suffer from the limitation of a limited focus range.

Still further, single lens cameras have a limited dynamic range as a result of their sensors (film or semiconductor sensors) having a limited dynamic range. This is a severe limitation when imaging scenes which contain both very bright areas and very dark areas. Typically, either the bright areas will appear overexposed while the dark areas have sufficient contrast, or the dark areas will appear underexposed while the bright areas have sufficient contrast. To address this issue, specialized semiconductor image sensors (e.g. the D1000 by Pixim, Inc. of Mountain View, Calif.) have been developed that allow each pixel of an image sensor to sampled each with a unique gain so as to accommodate different brightness regions in the image. But such image sensors are much more expensive than conventional CCD or CMOS image sensors, and as such are not cost-competitive for many applications, including mass-market general photography.

Because of the requirement to focus, single lenses can provide a rough estimate of the distance between the lens and a subject object. But since most photographic applications require lenses designed to have as long a range of concurrent focus as possible, using focus for a distance estimate is extremely imprecise. Since a single lens can only be focused to a single distance range at a time, at best, a lens will provide an estimate of the distance to a single object range at a given time.

Coded Aperture Imaging (CAI) (as disclosed in co-pending application entitled "Apparatus And Method For Capturing Still Images And Video Using Coded Aperture Techniques," Ser. No. 11/039,029, filed Jan. 18, 2005; hereinafter "CAI Application") addresses many of the limitations of a single lens camera. Relative to a single lens camera, CAI makes it possible to make a thinner camera, a lighter camera, a camera with greater dynamic range, and also a camera which can reconstruct an image which is in focus throughout a large range of depth in the scene.

A visible light coded aperture camera according to one embodiment described in the CAI Application is illustrated in FIG. 1. The illustrated embodiment includes a coded aperture 101 placed in front of a light sensitive grayscale or color semiconductor sensor 104. The coded aperture 1012 is a pattern of circular, square, hexagonal, rectangular or other tiled elements, some of which are transparent to visible light (e.g. element 102) and some of which are opaque (e.g. element 103). Note that for illustration clarity purposes, coded aperture 101 has very few transparent elements. A typical coded aperture may have significantly more transparent elements (e.g., 50%). Visible light a from 2-dimensional or 3-dimensional scene 100 (which may be illuminated by ambient or artificial lighting) is projected through the coded aperture 101 onto image sensor 104. The camera is capable of limiting the FOV to the fully coded FOV projected onto the sensor. In one embodiment, this is implemented by the use of a self-collimating coded aperture 101 (utilizing baffles for collimation, as explained below). The space between the coded aperture and the sensor is shielded by a light-opaque housing 105 (only the outline of which is shown in FIG. 1), preventing any light from reaching the sensor other than by passing through an open element of the coded aperture.

The camera further includes an image sensor readout subsystem 110 with an interface 109 to the image sensor 104 (which may be similar to those used in prior coded aperture systems). The readout subsystem clocks out the analog image signal from the image sensor 104 and applies analog buffering, amplification and/or filtering as required by the particular image sensor. An example of such a readout subsystem 110 that also incorporates A/D 120 is the NDX-1260 CleanCapture Image Processor by NuCore Technology, Inc. of Sunnyvale, Calif. The ability to adjust the zero offset 112 and gain 111 to analog pixel values read by the readout subsystem 110 (e.g., using at least one operational amplifier (op amp)) will increase the dynamic range of the captured image, but is not essential if the image sensor has a sufficient dynamic range for the desired image quality without a zero-offset and gain adjustment.

In one embodiment, the output of the readout subsystem 110 is coupled by interface 113 to at least one analog-to-digital converter (A/D) 120 which digitizes the analog output. The output of the A/D is coupled via interface 121 to an image reconstruction processor 130, which in one embodiment incorporates a Digital Signal Processor (DSP) 132 and Random Access Memory (RAM) 131. The digitized image from the interface 121 is stored in RAM 131, and the DSP 132 post-processes the image so as to reconstruct the original scene 101 into a grayscale or color image. In accordance with another embodiment, the image reconstruction processor 130 incorporates a general purpose CPU such as an Intel Corporation Pentium 4®, or similar general purpose processor. In yet another embodiment, the image reconstruction processor 130 incorporates an Application-Specific Integrated Circuit ("ASIC") which implements part or all of the reconstruction processing in dedicated digital structures. This grayscale or color image reconstructed by reconstruction processor 130 is output through interface 133 to be displayed on a display device 140.

However, one limitation of CAI is the resolution of the reconstructed image. The resolution of a CAI camera is limited by the larger of two primary factors: (a) the order of the aperture array, and (b) distortion in the projected image caused by diffraction. This is explained further in the following paragraphs.

FIG. 2 shows several representative coded aperture array patterns of MURAs of "order" 101, 61 and 31 (described in more detail in the CAI application). FIG. 2 also shows coded aperture array patterns of PBAs of order 8 and 24. (The PBAs 8 and 24 are shown enlarged relative to the MURAs to better show their patterns.) Note that the coded aperture array patterns are formed from a square array (with horizontal and vertical dimensions of the specified order) that is repeated twice in the horizontal and twice in the vertical dimension. So, for example, the MURA 101 pattern has a total size of 202×202. Note also that each of the aperture elements in the arrays is of the same size. Although it appears that some of the apertures are larger than others, this is simply because adjacent apertures combine to create what appears to be a larger aperture. A CAI camera can not resolve an image that is higher resolution than the order of its coded aperture array. For example, a MURA 101 CAI camera can not resolve an image of higher resolution than 101×101 pixels.

For purposes of illustration, FIG. 3 shows one embodiment of the visible light coded aperture camera shown in FIG. 1. The embodiment shown in FIG. 3 is not useful for many applications because the resolution of the reconstructed image is only 3×3 pixels, but it is illustrative of how a camera such as that shown in FIG. 1 works. A MURA order 3 ("MURA 3") aperture array 301 contains 16 open apertures, such as open aperture 302, and 20 closed apertures, such as closed aperture 303. Color or grayscale sensor 304 is the same size as one quadrant (i.e. one 3×3 block of apertures) of the MURA 3 aperture array 301 and in this embodiment it is positioned centered relative to the MURA 3 aperture array 301.

Orthographic View 320 of FIG. 3 reveals more of the structure of the camera. Baffles (referred to as "collimators" in the CAI Application) 315 serve to collimate the light passing through open apertures, such as open aperture 302. This restricts the FOV of each aperture projection onto color or grayscale sensor 304. Closed apertures such as closed aperture 303 are covered with an opaque cover so they do not allow light to pass through. Sensor 304 is separated from MURA 3 aperture array 301 and baffles 317 to allow space for the overlapping projections from each of the open apertures. The entire unit is contained within a light-tight camera body 316, which is shown to be transparent for the purposes of illustration. Note that in this particular example, even if sensor 304 is a very high-resolution sensor, only a 3×3 pixel image can be reconstructed.

FIG. 4 illustrates how light is projected through the MURA 3 aperture array. Illustration 400 shows the MURA 3 aperture array 401 delineated by a solid black outline, with exemplary open aperture 402 and closed aperture 403. The position of color or grayscale sensor 404 is delineated by a dotted outline. Open aperture 405 is delineated by a dashed line. The light that passes through aperture 405 projects onto a square area on the sensor plane shown as a gray square 406. Note that because aperture array 401 is shown overlaying the projection in illustration 400, much of projection 406 is obstructed by closed apertures. Nonetheless, the perimeter of projection 406 can be seen delineated by a solid gray outline.

In this embodiment, projection 406 is a square approximately 9 times larger than aperture 405 and centered on aperture 405. Depending on how close or far sensor 404 is to the aperture array, this projection may correspond to a wider or narrower FOV. Baffles around aperture 405 (not shown in this illustration, but visible as baffles 317 in FIG. 3) are used in this embodiment to limit the extent of projection 406 to approximately 9 times larger than the size of aperture 405.

Note that in this embodiment only a small percentage of the area of projection 406 overlaps sensor 404. Part of this overlap is visible through an open aperture 409 and part of it is obscured by closed aperture 408.

Illustration 410 shows the overlaying of the 4 projections from the upper right quadrant of aperture array 401. (For clarity, in illustrations 410 and 420, only the outline of MURA 3 aperture array 401 is shown.) The 4 open apertures 415 in the upper right quadrant are delineated with dashed outlines. The 4 projections 416 from these 4 apertures are shown as overlapping gray areas. Each projection, like the projection 406 shown in illustration 400, is a square approximately 9 times the size of its aperture and is centered on its aperture, and is delineated by a solid gray line. To indicate the number of overlapping projections in each area of the sensor plane, varying levels of gray scale are used to fill each area. The lightest gray indicates 1 projection, the next darker indicates 2 projections overlapping, the next darker indicates 3 projections overlapping, and finally the darkest indicates 4 projections overlapping.

Illustration 420 shows the overlaying of all 16 projections from the entire aperture array 401. The 16 open apertures 425 are delineated by dashed outlines. Each projection, like the projection 406 shown in illustration 400, is a square approximately 9 times the size of its aperture and centered on its aperture, and is delineated by a solid gray line. To indicate the number of overlapping projections in each area of the sensor plane, varying levels of gray scale are used as described in the previous paragraph. Note that in this embodiment each area of sensor 404 is shown covered by 4 overlapping projections. In practice, it is correct that there will be 4 overlapping projections over the vast majority of the sensor area, but because of tolerance variations, diffraction effects, and varying distances to objects in the observed scene, there may be fewer or more overlapping projections near the borders of projections, which are shown as solid gray lines in illustration 411.

Note also that most of the light hitting the MURA 3 aperture array 401 is projected beyond the edges of sensor 404, and as a result this light is not used for the reconstruction. If the area of the rightmost column of the MURA 3 aperture array 401 is disregarded (since all apertures in that column are closed, it does not contribute any light to the camera and can be removed from the system without impacting the image reconstruction), approximately 13% of the light hitting the remaining area of the MURA 3 aperture array 401 is actually projected onto the sensor 404. A conventional single f/2.8 lens transmits approximately 12.7% of the light hitting the lens, so the 13% light transmission performance of this MURA 3 coded aperture array camera can be seen as comparable to a conventional f/2.8 lens.

Generally speaking, f/2.8 is good light transmission performance for a photographic lens, so the description of the MURA 3 coded aperture camera in the last few paragraphs characterizes a camera with potentially desirable light transmission characteristics. Unfortunately, only a 3×3 pixel image can be reconstructed by the system described.

Each element in a CAI camera acts geometrically like a pinhole in a pinhole camera. Light passing through each aperture makes a projection onto the sensor, just as it would in a pinhole camera. And like a pinhole camera, a CAI camera is subject to the diffraction effects of light passing through a pinhole. In a pinhole, these diffraction effects create a point source projected pattern commonly known as the "Airy disk". The primary lobe of the Airy disk roughly defines the smallest resolvable spot size from a given pinhole camera projection. At a given distance from the pinhole to the sensor, the Airy disk increases in size as the pinhole decreases in size. From a geometric point of view, the resolution (i.e. minimum point source projection spot size) of images from a pinhole camera also increases as the pinhole gets smaller. So, for any given distance of pinhole to sensor, there is an optimum pinhole size where the point source projection spot size equals the size of the primary lobe of the Airy disk. If the pinhole is made smaller than this optimum size, resolution decreases because the Airy disk increases in size. If the pinhole is made larger than this optimum size, resolution decreases because a point source projection spot size increases. Since the characterization of resolution of a pinhole camera is subjective, different formulae have been proposed for calculating the optimal pinhole diameter. One such formula is $A=SQRT(55F)$, where A is the pinhole diameter in thousandths of an inch, F is the camera focal length in inches, and $SQRT()$ is the square root function.

Note that achievable resolution in a pinhole camera increases as the focal length of the camera increases. Unfortunately, the physical size of the camera typically increases in proportion to the focal length, and as a result, a very large camera is needed for high resolution pinhole images. For example (using the formula $A=SQRT(55F)$), the optimal pinhole size of a 1" focal length (i.e. 1" thick) pinhole camera is about 0.007". For a "normal" viewing angle of about 53°, this results in about a 134.8 pixel diagonal dimension, or about a 95×95 pixel resolution image. The optimal pinhole size of a 10" focal length (i.e. 10" thick) pinhole camera is about 0.023". With a 53° viewing angle, this results in about a 426.4 diagonal resolution, or about a 301×301 resolution image. (Note that different photographers will use different subjective criteria in assessing the resolvable resolution of a pinhole camera. The resolution calculated here is based on one interpretation of resolvable resolution. Other interpretations may lead higher or lower resolution assessments, but will normally be within a 2× range higher or lower than the numbers presented here.)

Like pinhole cameras, visible light CAI cameras are also subject to diffraction effects which may result in resolution/size trade-offs. The diffraction patterns are more complex than pinhole diffraction patterns because of the complexity of the aperture patterns, and consequently, determining the impact on image resolution and/or camera size requirements is more complex. But because the pixel resolution of the CAI image can be no higher than the order of the aperture array, to achieve a high-resolution image it is necessary to utilize high order aperture arrays which can potentially exhibit worse diffraction effects than lower order aperture arrays or, alternatively, require longer focal lengths (and, as a result, larger camera sizes) to mitigate those diffraction effects.

Another approach to improving the performance of a lens system in a digital camera is a plenoptic camera. The basic concept of a plenoptic camera is described in U.S. Pat. No. 5,076,687. Although the word "plenoptic" is not used in the patent, the device referenced in the patent is called a "plenoptic camera" by its inventor in a web page describing the camera at: http://www-bcs.mit.edu/people/jyawang/demos/plenoptic/plenoptic.html. In 2005, Stanford University researchers published a paper (Stanford Tech Report CTSR 2005-02) describing an application of a plenoptic camera implementation that achieves the DOF of a conventional f/22 lens while capturing the equivalent light from the scene that would be gathered by an f/4 lens. Unfortunately, this increase in light gathering ability comes at a theoretically linear cost of image resolution. The prototype constructed by the team resulted in about 2× beyond the theoretical resolution losses, so with a 4000×4000 pixel sensor they were able to reconstruct only a 296×296 image which exhibited the f/22 DOF with f/4 light capture (i.e. a 16 megapixel sensor yielded a 90 kilopixel image). While such a system might be useful for certain specialized applications, the enormous losses of sensor resolution would likely make such a system non-competitive for general photographic applications.

SUMMARY

An apparatus and method are described for capturing images. In one embodiment, the apparatus comprises: a coded lens array including a plurality of lenses arranged in a coded pattern with opaque material blocking array elements not containing lenses; and a light-sensitive semiconductor sensor coupled to the coded lens array and positioned at a specified distance behind the coded lens array, the light-sensitive sensor configured to sense light transmitted through the lenses in the coded lens array.

BRIEF DESCRIPTION OF THE DRAWINGS

A better understanding of the present invention can be obtained from the following detailed description in conjunction with the drawings, in which:

FIG. 2 illustrates three exemplary MURA patterns and two exemplary PBA patterns employed in accordance with the underlying principles of the invention.

FIG. 18 illustrates a reconstruction of an image at different ranges to identify the correct range in accordance with one embodiment of the invention.

FIG. 19 illustrates an image in which a person is standing close to a camera, while mountains are far behind the person.

FIG. 20 illustrates how the person from FIG. 19 can readily be placed in a scene with a different background.

FIG. 21 illustrates a photograph of an exemplary motion capture session.

DETAILED DESCRIPTION

A system and method for capturing still images and video using coded lens imaging techniques is described below. In the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Camera System Architecture

Figure 5:
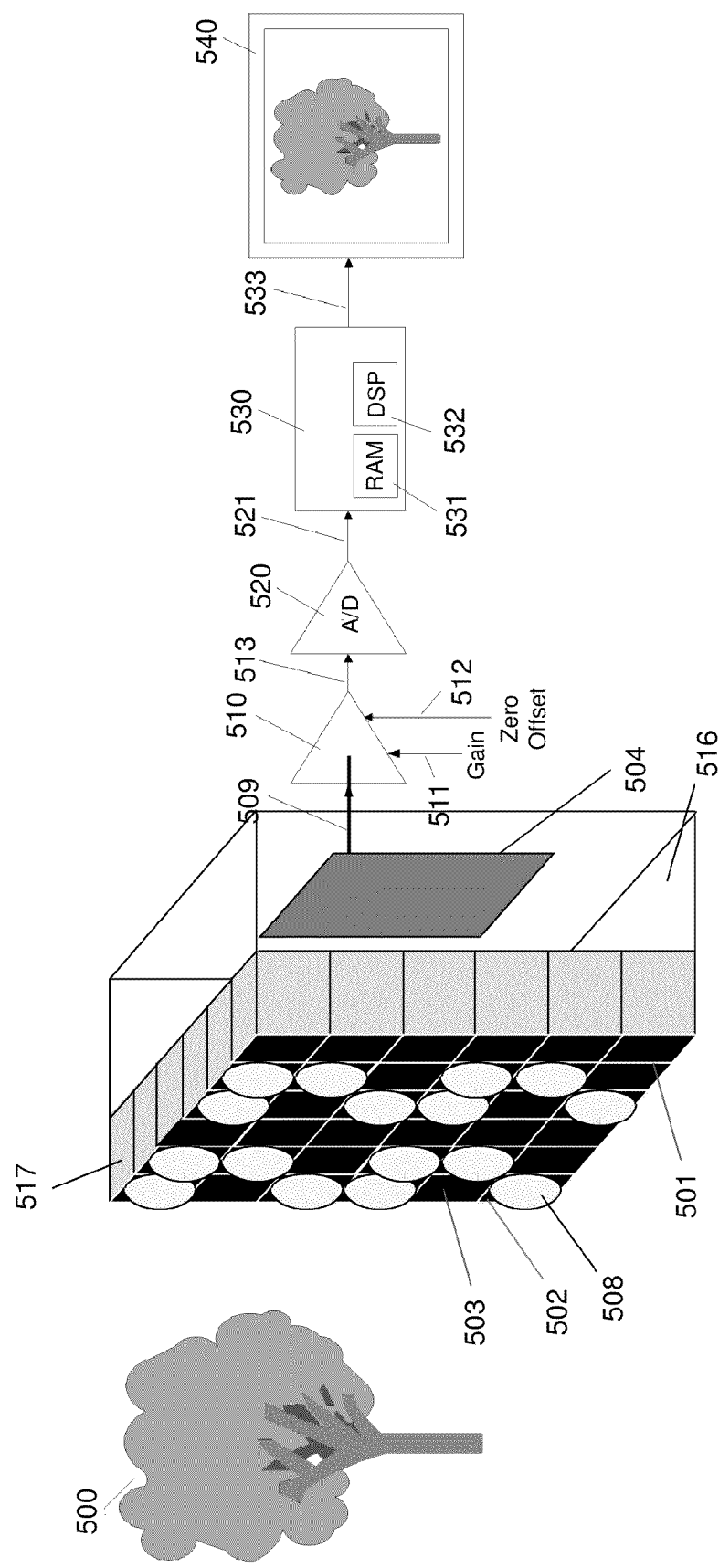
FIG. 5 illustrates a coded lens camera according to one embodiment of the invention.

A visible light coded lens array camera, for either single shot images or sequential (e.g. video) images, including readout electronics and display, according to one embodiment of the invention, is illustrated in FIG. 5. The illustrated embodiment includes a coded lens array 501 placed in front of a light sensitive grayscale or color semiconductor sensor 504. The coded lens array 501 is a pattern of circular, square, hexagonal or rectangular (or any pattern that can be tiled on a plane) apertures, some of which are transparent (i.e. "open") to visible light (e.g. element 502) and some of which are opaque (i.e. "closed") to visible light (e.g. element 503). Each open aperture, such as 502, is covered by (or contains) a lens such as 508, so that virtually all of the light passing through the open aperture passes through the lens. A typical coded lens array has approximately 50% transparent apertures, each with a lens. The coded lens array pattern shown is a MURA order 3 with a 4/5 ratio of transparent to opaque apertures. Visible light a from 2-dimensional or 3-dimensional scene 500 (which may be illuminated by ambient or artificial lighting) is projected through the lenses and open apertures of coded aperture array 501 onto image sensor 504. (The camera is capable of limiting the FOV to the fully coded FOV projected onto the sensor. The light contributions of overlapping projections in this fully coded FOV is shown in illustration 620 of FIG. 6.) In one embodiment, this is implemented by the use of a self-collimating coded lens array 501 (self-collimation is accomplished through baffles 517 behind the coded lens array 501, which are explained below). The space between the coded lens array and the sensor is shielded by a light-opaque housing 516 (only the outline of which is shown in FIG. 5), preventing any light from reaching the sensor other than by passing through a lens and open aperture of the coded lens array 501.

The camera further includes an image sensor readout subsystem 510 with an interface 509 to the image sensor 504. The readout subsystem clocks out the analog image signal from the image sensor 504 and applies analog buffering, amplification and/or filtering as required by the particular image sensor. An example of such a readout subsystem 510 that also incorporates A/D 520 is the NDX-1260 CleanCapture Image Processor by NuCore Technology, Inc. of Sunnyvale, Calif. The ability to adjust the zero offset 512 and gain 511 to analog pixel values read by the readout subsystem 510 (e.g., using at least one operational amplifier (op amp)) will increase the dynamic range of the captured image, but is not essential if the image sensor has a sufficient dynamic range for the desired image quality without a zero-offset and gain adjustment.

In one embodiment, the output of the readout subsystem 510 is coupled by interface 513 to at least one analog-to-digital converter (A/D) 520 which digitizes the analog output. The output of the A/D is coupled via interface 521 to an image reconstruction processor 530, which in one embodiment incorporates a Digital Signal Processor (DSP) 532 and Random Access Memory (RAM) 531. The digitized image from the interface 521 is stored in RAM 531, and the DSP 532 post-processes the image so as to reconstruct the original scene 500 into a grayscale or color image. In accordance with another embodiment, the image reconstruction processor 530 incorporates a general purpose CPU such as an Intel Corporation Pentium 4®, or similar general purpose processor. In yet another embodiment, the image reconstruction processor 530 incorporates an Application-Specific Integrated Circuit ("ASIC") which implements part or all of the reconstruction processing in dedicated digital structures. This grayscale or color image reconstructed by reconstruction processor 530 is output through interface 533 to be displayed on a display device 540.

Figure 6:
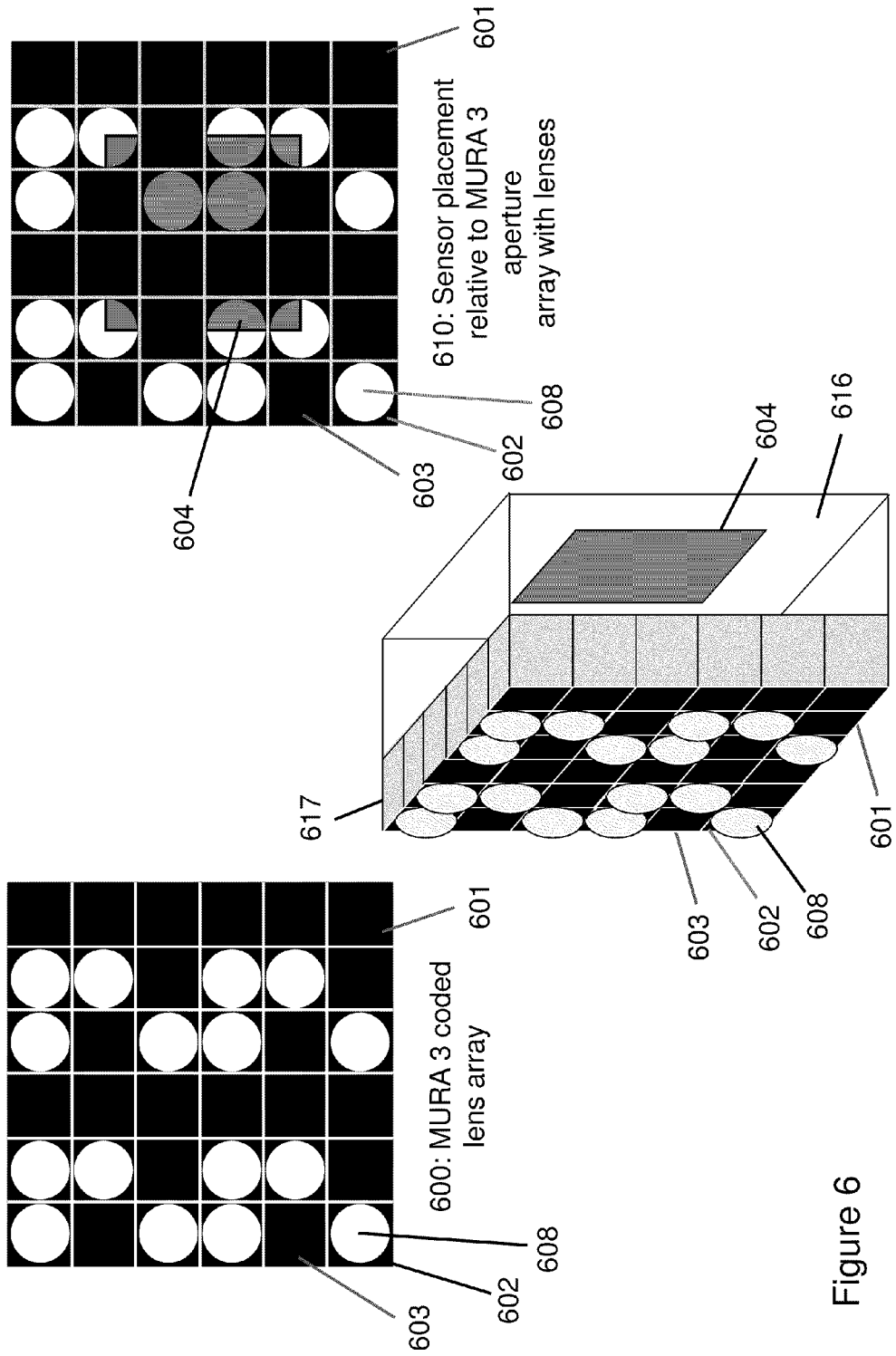
FIG. 6 illustrates the configuration of a MURA order 3 coded lens array, baffles, sensor, and a camera body in accordance with one embodiment of the invention.

FIG. 6 shows one embodiment of the visible light coded lens array camera shown in FIG. 5. A MURA order 3 ("MURA 3") lens array 601 contains 16 open apertures, such as open aperture 602, and 20 closed apertures, such as closed aperture 603. Each open aperture, such as 602, contains one lens. In the illustrated embodiment, the lenses are round, but in alternative embodiments the lens may be other shapes (e.g. squares or hexagons) that may more completely fill the open aperture 602 area. But, regardless of the shape of lens 608 in the present embodiment, any remaining area of the open aperture 602 not filled by lens 608 must be opaque or nearly opaque. Color or grayscale sensor 604 is the same size as one quadrant (i.e. one 3×3 block of apertures) of the MURA 3 aperture array 601 and in this embodiment it is positioned centered relative to the MURA 3 aperture array 601, as shown in illustration 610. (Illustration 610 shows sensor 604's placement location behind MURA 3 lens array 601 by showing it through the circles that illustrate the shape of the lenses. This is done simply for the sake of illustration, and this may not what would be seen upon visual inspection of an actual system due to the refraction effects of the lenses if an observer would look through them.)

Orthographic View 620 of FIG. 6 reveals more of the structure of the camera. Baffles (referred to as "collimators" in the CAI Application) 617 serve to collimate the light passing through the lens and open apertures, such as open aperture 602 and lens 608. This restricts the FOV of each aperture projection onto color or grayscale sensor 604. Closed apertures such as closed aperture 603 are covered with an opaque cover so they do not allow light to pass through. Sensor 604 is separated from MURA 3 aperture array 611 and baffles 617 to allow space for the overlapping projections from each of the open apertures. The entire unit is contained within a light-tight camera body 616, which is shown to be transparent for the purposes of illustration.

Figure 7:
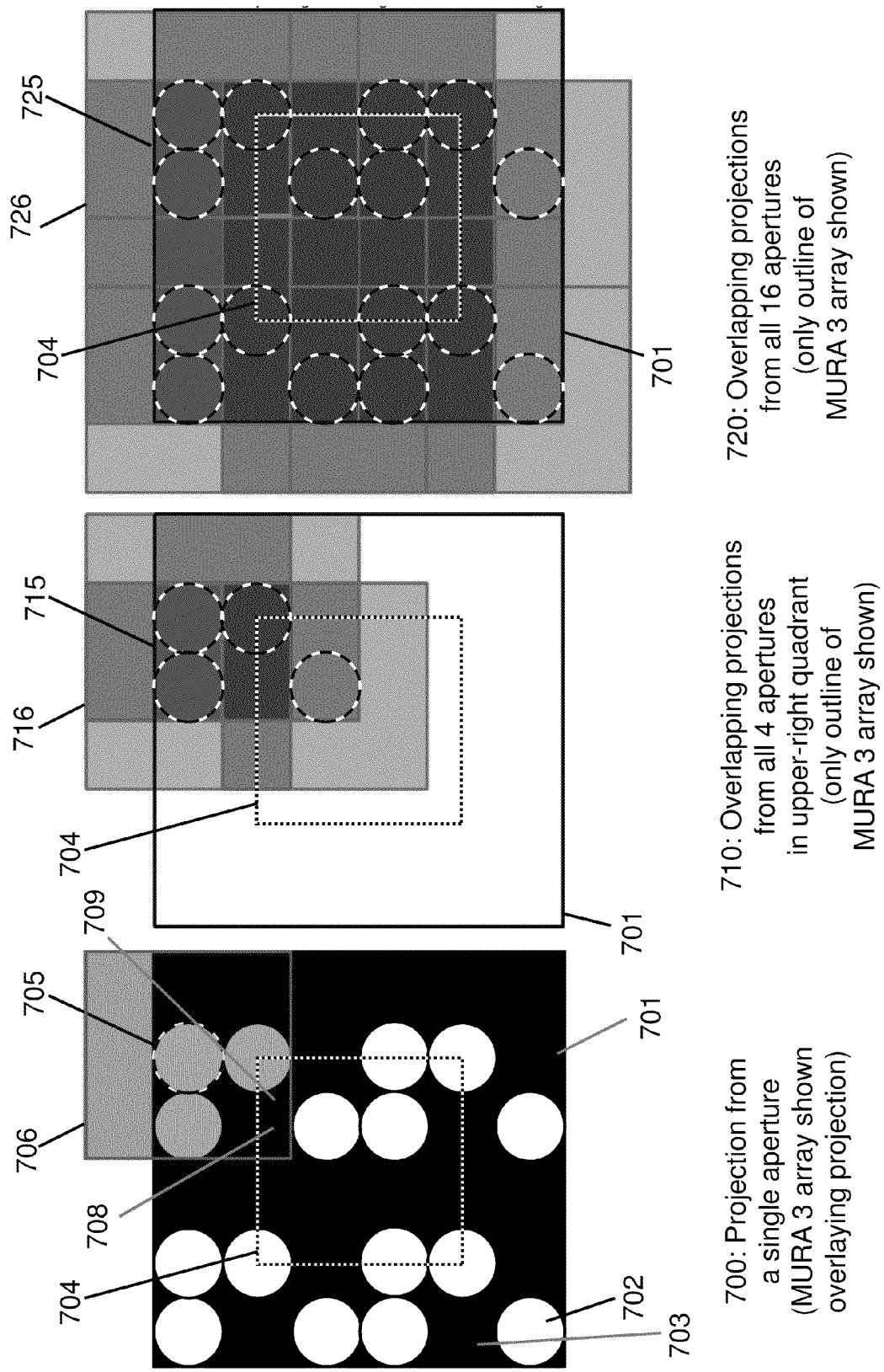
FIG. 7 illustrates the projection of light from transparent apertures in a MURA 3 coded lens array in accordance with one embodiment of the invention.

FIG. 7 illustrates how light is projected through the MURA 3 coded lens array 701. Illustration 700 shows the MURA 3 coded lens array 701, with exemplary open aperture and lens 702 and closed aperture 703. The position of color or grayscale sensor 704 that would be located behind coded lens array 701 is delineated by a dotted outline. Lens 705 is delineated by a dashed line. The light that passes through lens 705 projects onto a square area on the sensor plane shown as a gray square 706. Note that because aperture array 701 is shown in illustration 700 as overlaying the projection, much of projection 706 is obstructed by closed apertures. Nonetheless, the perimeter of projection 706 can be seen delineated by a solid gray outline.

In this embodiment, projection 706 is a square approximately 9 times larger than open aperture square around lens 705 and centered on lens 705. Depending on how close or far sensor 704 is to the aperture array, this projection may correspond to a wider or narrower FOV. Baffles around open aperture 705 (not shown in this illustration, but visible as baffles 617 in FIG. 6 are used in this embodiment to limit the extent of projection 706 to approximately 9 times larger than the size of lens 705.

Note that in this embodiment only a small percentage of the area of projection 706 overlaps sensor 704. Part of this overlap is visible (illustratively, although not necessarily physically) through the lens of open aperture 709 and part of it is obscured (illustratively) by closed aperture 708 and the area around the lens in open aperture 709.

Illustration 710 shows the overlaying of the 4 projections from the upper right quadrant of aperture array 701. (For clarity in illustration 710 and 720, only the outline of MURA 3 coded lens array 701 is shown.) The 4 lenses of open apertures 715 in the upper right quadrant are delineated with dashed outlines. The 4 projections 716 from these 4 lenses are shown as overlapping gray areas. Each projection, like the projection 706 shown in illustration 700, is a square approximately 9 times the size of the open aperture square surrounding its lens and is centered on its lens, and is delineated by a solid gray line. To indicate the number of overlapping projections in each area of the sensor plane, each area is filled with varying levels of gray scale. The lightest gray indicates 1 projection, the next darker indicates 2 projections overlapping, the next darker indicates 3 projections overlapping, and finally the darkest indicates 4 projections overlapping.

Illustration 720 shows the overlaying of all 16 projections from the entire aperture array 701. The 16 lenses of all open apertures 725 are delineated by dashed outlines. Each projection, like the projection 706 shown in illustration 700, is a square approximately 9 times the size of the open aperture square surrounding its lens and centered on its lens, and is delineated by a solid gray line. To indicate the number of overlapping projections in each area of the sensor plane, varying levels of gray scale are used as described in the previous paragraph. Note that in this embodiment each area of sensor 704 is shown covered by 4 overlapping projections. In practice, it is correct that there will be 4 overlapping projections over the vast majority of the sensor area, but because of tolerance variations, diffraction effects, lens aberrations and varying distances to objects in the observed scene, there may be fewer or more overlapping projections near the borders of projections, which are shown as solid gray lines in illustration 720.

Note also that most of the light hitting the MURA 3 coded lens array 701 is projected beyond the edges of sensor 704, and as a result this light is not used for the reconstruction. If the area of the rightmost column of the MURA 3 coded lens array 701 is disregarded (since all apertures in that column are closed, it does not contribute any light to the camera and can be removed from the system without impacting the image reconstruction), approximately 10.2% (because round lenses are used in this embodiment, if square lenses were used in an alternate embodiment, the number would be approximately 13%) of the light hitting the remaining area of the MURA 3 aperture array 701 is actually projected onto the sensor 704. A conventional single f/3.1 lens transmits approximately 10.2% of the light hitting the lens, so the 10.2% light transmission performance of this MURA 3 coded aperture array camera can be seen as comparable to a conventional f/3.1 lens.

Figure 1:
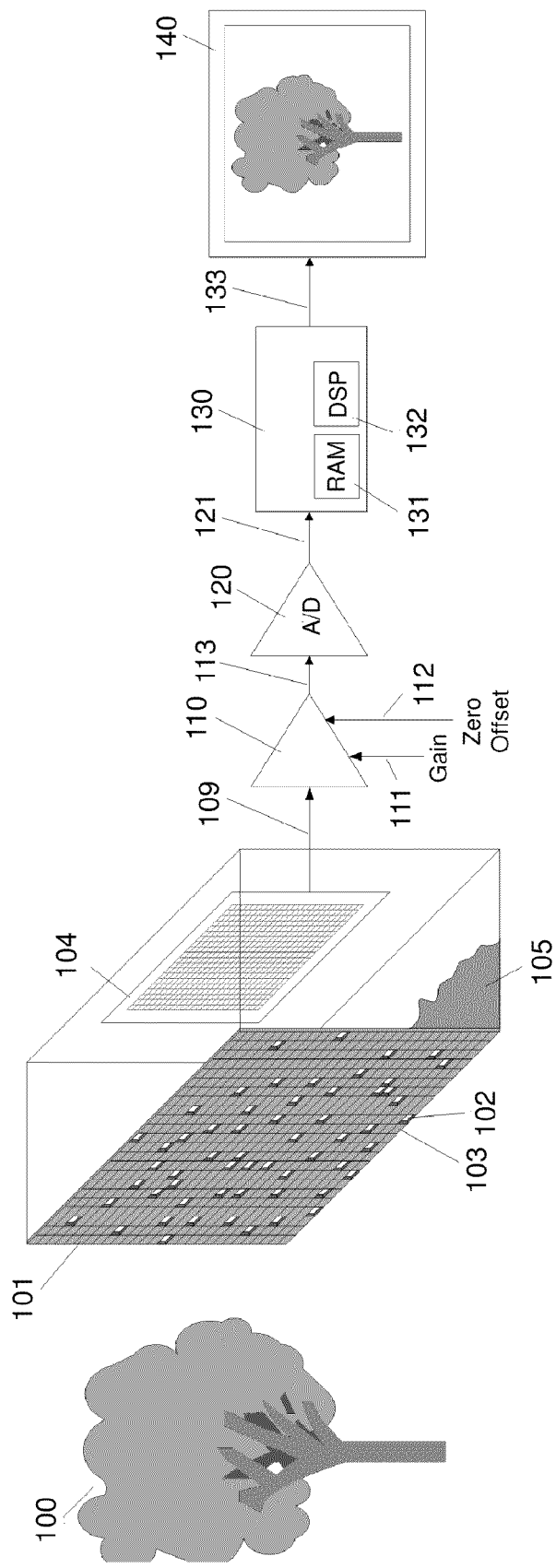
FIG. 1 illustrates a visible light coded aperture camera according to one embodiment of the invention.
Figure 3:
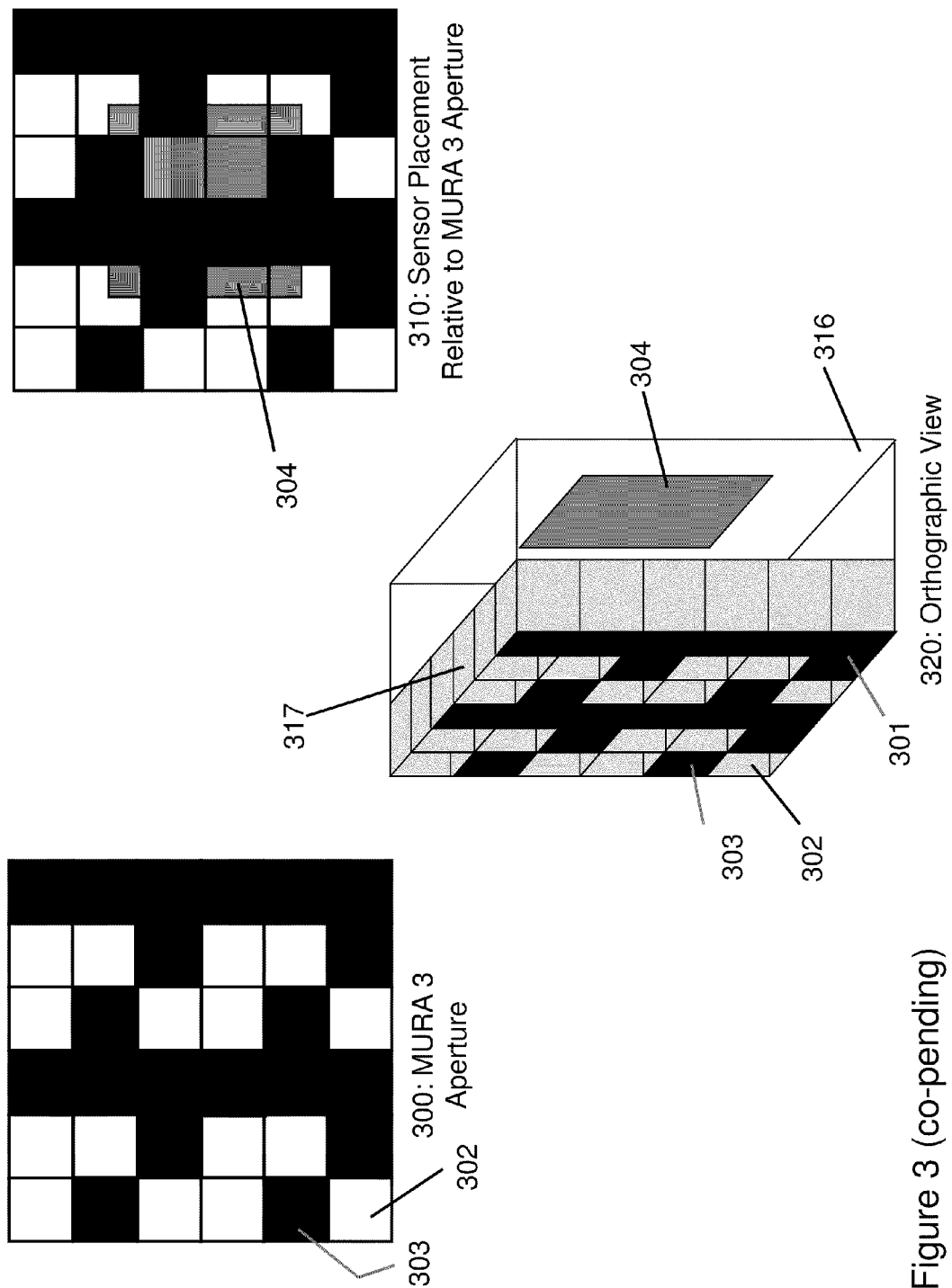
FIG. 3 illustrates the configuration of a MURA order 3 coded aperture array, baffles, sensor, and a camera body in accordance with one embodiment of the invention.
Figure 4:
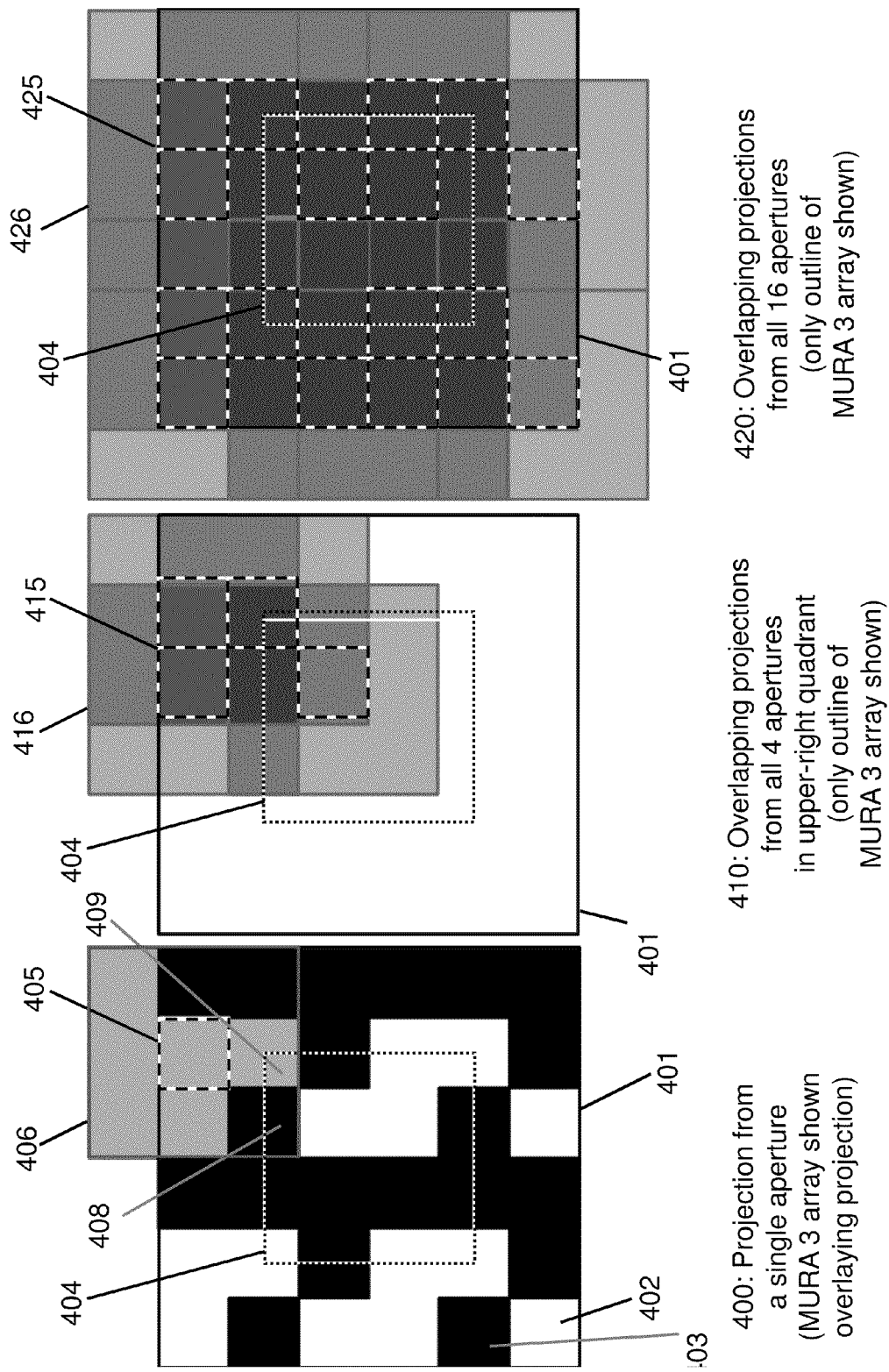
FIG. 4 illustrates the projection of light from transparent apertures in a MURA 3 coded aperture array in accordance with one embodiment of the invention.

Generally speaking, f/3.1 is good light transmission performance for a photographic lens, so the description of the MURA 3 coded lens array camera in the last few paragraphs characterizes a camera with potentially desirable characteristics. And unlike a MURA 3 coded aperture array camera, such as that illustrated in FIGS. 3 and 4, which is limited to a 3×3 pixel resolution in the reconstruction, the MURA 3 coded lens array camera illustrated in FIGS. 5, 6 and 7 is capable of reconstructing an image at least up to the approximate diffraction limits of each of the lenses in the MURA 3 coded lens array. For example, in the case of lenses 12 mm lenses with a 36 mm focal length and a 53 degree FOV, more 2000×2000 resolution (4 megapixels) is achievable within the diffraction limits.

The preceding illustrated examples show the size of the sensor as being approximately equal to the size of one quadrant (i.e. one-half size in each dimension) as the size of the coded lens array. Although this is a typical configuration, in one embodiment the sensor dimensions are independent from the coded lens array dimensions, but the system is configured in such a way that the coded lens array projects a pattern onto the sensor that is equivalent to the pattern that would have been projected had the sensor been equal to the size of one quadrant of a coded lens array and with appropriate spacing and focal length such as the coded lens camera configurations described herein. In other words, the reconstruction of the image using the techniques described herein are reliant on the configuration of overlapping pattern of images of the scene projected onto the sensor, not on the particular configuration of the coded lens array relative to the sensor. If a different coded lens array configuration than one described herein can achieve a similar overlapping pattern on the sensor, then the image reconstruction will be the same. For example, if telephoto lenses in a MURA 3 pattern are positioned far from the sensor, but the optical path of each is angled in such a way that the projected pattern on the sensor is the same as the pattern shown in FIG. 7, then the image can still be reconstructed correctly.

According to one embodiment of the system illustrated in FIG. 5, the resulting output 533 from the reconstruction processor is a 2-dimensional array of grayscale or color pixels representing the scene within the FOV of the camera. In one embodiment, the pixel data is transmitted through a digital interface to a computer (or other image processing device). Thus, the output of the coded aperture camera will appear to any attached device as if it is the output of a conventional digital camera. The digital interface for transferring the reconstructed image data may be any digital interface capable of handling the bandwidth from the camera for its required application such as for example, a IEEE1394 ("FireWire") interface or a USB 2.0 interface (which would be suitable for current still and video camera applications). Of course, the underlying principles of the invention are not limited to any particular digital interface. Preferably, the camera includes a display 540 (e.g., an LCD or OLED display), for presenting the reconstructed images to the photographer, but in this embodiment, display device 540 and interface 533 are optional.

According to one embodiment, the camera does not include reconstruction processor 530. Instead, the digitized image data from the A/D converter 520 is coupled through interface 521 to an output buffer where the image data is packetized and formatted to be output through a digital interface. The digital interface would typically be coupled to an external computing means such as a personal computer, either to be processed and reconstructed immediately, or stored on a mass storage medium (e.g., magnetic or optical disc, semiconductor memory, etc.) for processing and reconstruction at a later time. Preferably, the external computing device has a display for presenting the reconstructed images to the photographer. Alternatively, or in addition, the digital interface is coupled directly to a mass storage medium (e.g., magnetic or optical disc, semiconductor memory, etc.). The digital interface for transferring the reconstructed image data could be any digital interface capable of handling the bandwidth from the camera for its required application (e.g., IEEE1394 ("FireWire") interface or a USB 2.0 interface).

Coded Lens Array Pattern Construction

According to one embodiment of the invention, the coded lens array 501 is a Modified Uniformly Redundant Array ("MURA") pattern. According to another embodiment of the invention, the coded lens array 501 is a Perfect Binary Array ("PBA") pattern. According to another embodiment of the invention, the coded lens array 501 is a Uniformly Redundant Array ("URA") pattern. And according to yet another embodiment of the invention, the coded lens array 501 is a random pattern (although the performance of the system typically will not be as optimal with a random pattern as it will with a MURA, PBA, or URA). Typically, the basic aperture pattern would be the same size as the sensor, and the overall coded lens array would be a 2×2 mosaic of this basic aperture pattern. Each transparent aperture in the array contains a lens. Three exemplary MURA patterns and one PBA pattern are illustrated in FIG. 2. MURA 101 is a 101×101 element pattern, MURA 61 is a 61×61 element pattern, and MURA 31 is a 31×31 element pattern. PBA 8 is a 8×8 element pattern, and PBA 24 is a 24×24 element pattern. The PBA patterns are illustrated as enlarged relative to the MURA patterns. In each pattern, each black area is opaque and each white area is transparent (open) and would contain a lens.

Coded Lens Array Fabrication

In one embodiment, the coded aperture consists of a microlens array such as those manufactured by Suss Micro-optics of Neuchatel, Switzerland. A microlens array is an array of typically plano-convex lenses fabricated in a typically a rectilinear or hexagonal grid. In one embodiment, a microlens array would be used for the coded lens array with a lens at each location on the grid, but those lenses occurring at "closed" aperture location would be painted over with an opaque paint or an opaque material would be lithographically coated at the "closed" aperture locations.

In another embodiment a microlens array would be fabricated with only lenses at locations of an "open" aperture in the coded lens array. "Closed" aperture locations in the coded lens array would be either painted with an opaque paint, or a opaque material would be lithographically coated at the "closed" aperture locations.

Baffles, Camera FOV, and Light Attenuation

According to the present invention the distance between the coded lens array and the sensor plane is chosen in such a way that each of the projections of the individual lenses is in focus. For imaging an object at infinity, the sensor plane is therefore placed at the focal plane of the lenses. For imaging an object at a finite distance, the sensor plane might be placed slightly behind the focal plane of lenses in order to focus at the desired distance. Unlike in coded aperture imaging, the distance between the coded lens array and the sensor plane may therefore not be chosen arbitrarily, but a constraint between focal length, image plane to sensor plane distance, and distance of the object to be image must be observed.

One embodiment of the camera employs techniques to limit the FOV (FOV) to the fully coded FOV (FCFOV). Alternatively, the techniques of limiting the FOV may be dimensioned in such a way that the FOV is slightly larger than the FCFOV, i.e., in such a way that the FOV is composed of the FCFOV plus a small part of the partially coded FOV (PCFOV). This way, the FOV of a coded lens camera can be increased at the expense of only a very minor degradation in image quality.

According to one embodiment, FOV limitation is achieved by placing baffles either in front of or behind the lenses in order to limit the maximum angles at which rays can pass through the coded lens array and reach the sensor.

Note that the length of the baffles determines the size of the FOV: The longer the baffles, the narrower the FOV of the coded lens camera.

Figure 8:
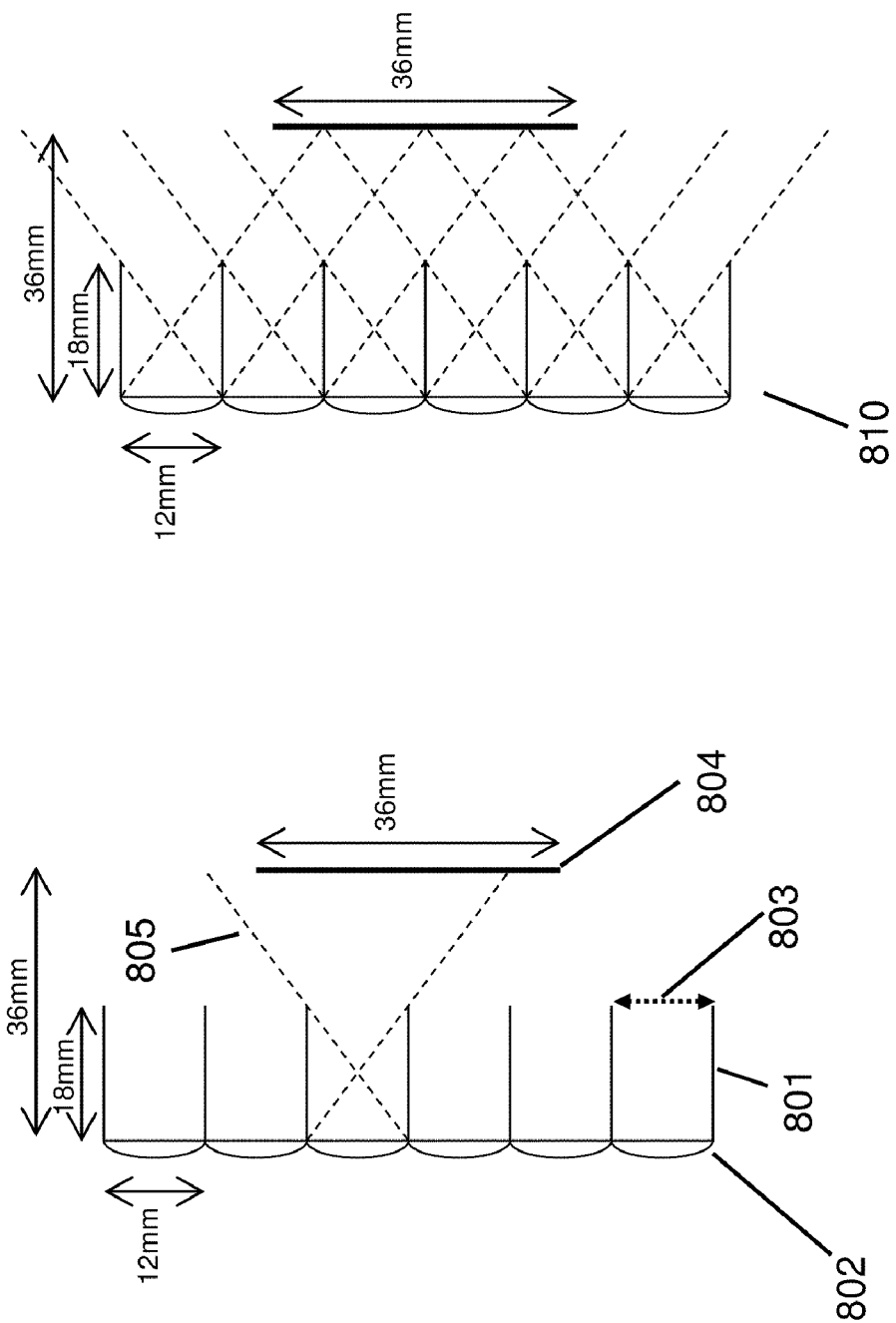
FIG. 8 illustrates a side view of a MURA order 3 coded lens camera in accordance with one embodiment of the invention.

FIG. 8 illustrates a side view of the projected FOVs of each of the lenses in a MURA 3 coded lens camera. In this example, the baffles 801 are placed behind the lenses 802, i.e. on the side of the lens facing the sensor 804. It should be noted, however, that the baffles may also be placed in front of the lenses, i.e. on the side of the lens facing the scene.

However, placing the baffles behind the lenses has the advantage that the exit pupil 803 of the lens system is moved closer towards the sensor plane. This way the size of the diffraction patterns caused by each lens is reduced and hence the achievable resolution of the overall imaging system is increased.

FIG. 8 further shows how the FOV of each lens is determined by the marginal rays 805, passing through the edges of the lens and passing just by the edge of the baffles on the opposite side. Let l denote the length of the baffles (l=18 mm in FIG. 8) and let further d denote the diameter of a single lens. Then, as can be seen from FIG. 8, the angular field of view α is given by $$\tan \alpha/2 = d/l$$

or $$\alpha = 2a \tan(d/l).$$

In the example shown in FIG. 8 where d=12 mm and l=18 mm, an angular field of view of α=67.38° results.

The right hand illustration 810 of FIG. 8 shows how the projections caused by the individual lenses overlap in the sensor plane. Each lens has the same angular field of view. However, due to the displacement of the lenses towards each other, there is a parallax for objects at a finite distance. Therefore, the field of view of the overall imaging system is approximately the same as the field of view of an individual lens, but may be slightly larger for objects at a finite distance due to this parallax effect.

It should be noted that FIG. 8 shows a complete row of lenses. However, in a coded lens imaging system, some of the positions in each row will not contain any lens but be blocked. The figure only shows the complete row of lenses for illustrative purposes. Different rows of lenses in a coded lens array will contain lenses in different positions. Since typically each position will contain a lens in at least one row, the overall field of view can be derived as depicted in FIG. 8.

When using baffles, light passing through the coded lens array parallel to the optical axis will not be attenuated. However, light passing through the coded lens array at an angle with respect to the optical axis will be partially blocked by the baffles.

As a result, after imaging and reconstructing a scene in a coded lens camera, the sensitivity of the camera is higher in the center of the FOV (light parallel to the optical axis) than it is towards the edges of the FOV (larger angles with respect to the optical axis), due to the baffle attenuation. Thus, when imaging a constant-intensity surface, the reconstruction will be bright in the center and darker and darker towards the edges of the image. Therefore, in one embodiment of the invention, baffle attenuation is compensated for by multiplying each pixel of the reconstructed image with the inverse of the baffle attenuation the pixel has been subjected to. The baffle attenuation is known from the geometry of the lenses and baffles. This way, in the absence of any noise, a constant-intensity surface is reconstructed to a constant-intensity image.

It should be noted, however, that inverting the baffle attenuation also causes any noise in the reconstruction to be amplified with the same factor as the signal. Therefore, the signal-to-noise ratio (SNR) of the reconstructed image is highest in the center of the image and decreases towards the edges of the image, reaching the value zero at the edges of the FOV.

According to one embodiment of the invention, this problem is alleviated by using only a central region of the reconstructed image while discarding the periphery of the reconstructed image. According to another embodiment, the problem is further alleviated by applying a noise-reducing smoothing filter to image data at the periphery of the reconstructed image.

From the literature, Wiener filters are known to be optimum noise-reducing smoothing filters, given that the signal-to-noise ratio of the input signal to the Wiener filter is known. In the reconstructed image of a coded lens camera, the signal-to-noise ratio varies across the image. The SNR is known for each pixel or each region of the reconstructed image. According to one embodiment, noise-reduction is achieved by applying a local Wiener filtering operation with the filter characteristic varying for each pixel or each region of the reconstructed image according to the known SNR variations.

Coded Lens Array DOF

Unlike a coded aperture camera, which projects an image in focus at all scene object distances, a coded lens camera is subject to the focus limitations of the lenses in its coded lens array. Typically, in a conventional single lens camera, the Depth of Field (DOF) (i.e. the range from near focus to far focus) of the camera is inversely proportional to the camera's light gathering capability. This is because the DOF is typically increased by narrowing the aperture of the lens, which reduces the light from the scene that reaches the sensor.

Although a coded lens camera does have focus limitations, a principal advantage of the coded lens camera over a conventional single lens camera is that as the effective lens aperture is narrowed to increase the DOF, the amount of light from the scene reaching the sensor is not substantially reduced.

Consider the following: A coded lens array typically has about 50% transparent apertures with lenses and 50% opaque apertures, so typically 50% of the light from the scene passes through the coded lens array. The overlapping projections of the coded lens array typically projects onto an area 4 times the area of the sensor, so approximately 25% of the projected light hits the sensor. So, in total, typically 25%*50%=12.5% of the light from the scene that is incident upon the coded lens array reaches the sensor. (Of course, less light may be transmitted due to attenuation from using round lenses instead of square lenses, the baffles, lens imperfections, and aberrations, and also, more light may be transmitted because a given aperture pattern may have more open than closed apertures, but geometrically, 12.5% represents the average light transmission of square apertures with 50% open apertures and is a reasonable approximation for a coded lens system.) 12.5% light transmission is approximately equivalent to a f/2.8 aperture on a single lens (which has 12.7% light transmission).

With a typical single lens system an f/2.8 aperture is a very wide aperture setting. On a 50 mm lens, f/2.8 corresponds to a 17.9 mm aperture. Consider a Nikon D100 6 megapixel camera with a 50 mm lens. If the lens is focused on a subject at a 25' (25 foot) distance, the near focus limit is approximately 21.3' and the far focus limit is approximately 30.2' (30.2'−21.3'=8.82' of total DOF). (Note: focus limits are subjective and will vary from photographer to photographer, but the same criteria are utilized for the different conditions considered in this section, so the results can be considered relative to one another. These calculations were made using a Depth of Field online calculator at http://www.dofmaster.com/dofjs.html). Any object in the scene closer than the near focus or farther than the far focus will be subject to a reduction in sharpness. Although 8.82' is a short DOF, the f/2.8 setting passes about 12.7% of the light from the scene.

Consider now an f/16 setting for the same Nikon D100 with a 50 mm lens. Now the aperture diameter is only 3.1 mm and only 0.4% of the light from the scene reaches the sensor. If the lens is focused on a subject at a 25' distance, the near focus limit is approximately 13' and the far focus limit is 805'. So, everything in the scene from 13' to 805' is in focus, for a 792' DOF. Clearly, this is a dramatic improvement in DOF over the 8.82' DOF at f/2.8. But it comes at a dramatic cost in light transmission, f/16 only transmits 0.4%/12.7%=3% of the light transmitted by f/2.8, so it can only be used with very well-illuminated scenes.

Consider the same Nikon D100, but instead of using a single conventional 50 mm lens, a 50 mm square PBA 8 coded lens array is utilized, again focused on an object 25' in the distance. The PBA 8 pattern shown in FIG. 2 would be utilized, with a lens placed in each transparent (i.e. illustrated as white) aperture of the PBA 8. Since a PBA 8 is a 16×16 aperture array and in this embodiment it is 50 mm in length on each side, each lens would be about 3.1 mm in diameter, which is about the same diameter as a conventional single 50 mm lens stopped down to f/16. And as a result, the DOF of the PBA 8 coded lens array would be roughly the same as the DOF of a conventional 50 mm lens stopped down to f/16. But, because the coded lens array transmits approximately 12.5% of the light from the scene, its light transmission is similar to f/2.8. So, this embodiment of a coded lens array has a DOF comparable to an f/16 conventional lens with the light transmission characteristics of an f/2.8 conventional lens.

In another embodiment, the same coded lens array described in the previous paragraph is used with a Nikon D100 camera, but the coded lens array is focused on an object 26' in the distance instead of 25' away. In this case the near focus limit is 12.9' and the far focus limit is infinity. Since everything is in focus from a certain distance through infinity, the coded lens array is functioning as a "hyperfocal lens", with its focus distance set to the "hyperfocal distance". This configuration is useful for certain applications where all of the objects in the scene are at least 12.9' away, and then the lenses in the coded lens array can be set to a fixed focus and do not need to be adjusted. Note that if an object in the scene is slightly closer than 12.9', it still may be usefully imaged. It simply will not be captured at the highest resolution, but as objects continue to get closer than 12.9', they will get increasingly fuzzier (i.e. lower resolution). So, for applications that require high resolution for objects closer than 12.9', a focusing means for the lenses in the coded lens array will be required.

Coded Lens Array Aberration Correction and Focusing

For clarity of illustration, the coded lens arrays shown in most of the figures have only a single lens element in each transparent aperture. Although this may be sufficient for some applications, in other applications, it is desirable to use multiple lens elements to correct for image aberrations, such as geometric distortion, coma, and chromatic aberrations. For over a century, an entire lens industry has been devoted to designing multi-element lenses to address lens aberration issues, and this vast corpus of prior art work will not be repeated here. Suffice it to say that typically, 3 elements or more are needed for photographic-quality imaging, and further, that typically, one or more of these elements needs to translate back-and-forth on the optical axis for focusing, unless the camera has a fixed focus. Frequently, such back-and-forth motion is accomplished by a rotating mechanism that turns a collar around part or all of the lens, which in turn engages a thread which moves one or more of the lens elements along the optical axis.

Figure 14:
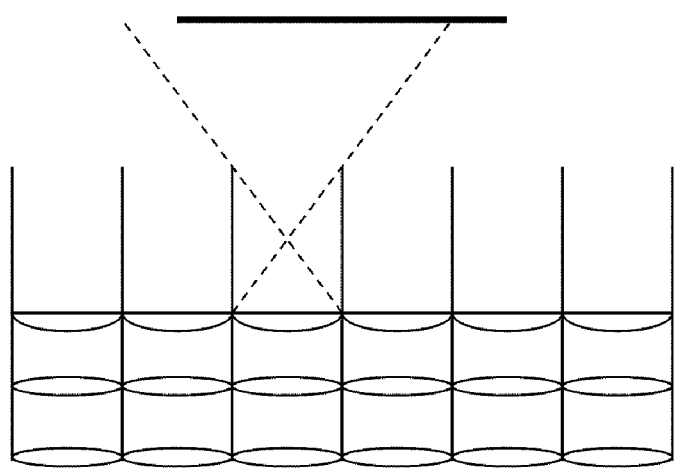
FIG. 14 illustrates a side view of a MURA order 3 coded lens camera with multi-element lens in accordance with one embodiment of the invention.

FIG. 14 illustrates a side view of a coded lens array with three-element lenses. The lens shapes shown are simply for illustrative purposes, and the actual lens shapes would vary depending on the optical characteristics desired, using any of a vast number of prior art photographic lens designs. Each aperture would have 3 such lenses in a stack within one or more concentric cylinders. Baffles would extend behind the last lens toward the sensor so as to limit the FOV of the projection. Note that each aperture position is shown containing a stack of lenses in this illustration. In practice, opaque apertures would not contain lenses, or they would be covered so as not to permit light to pass through them.

Figure 15:
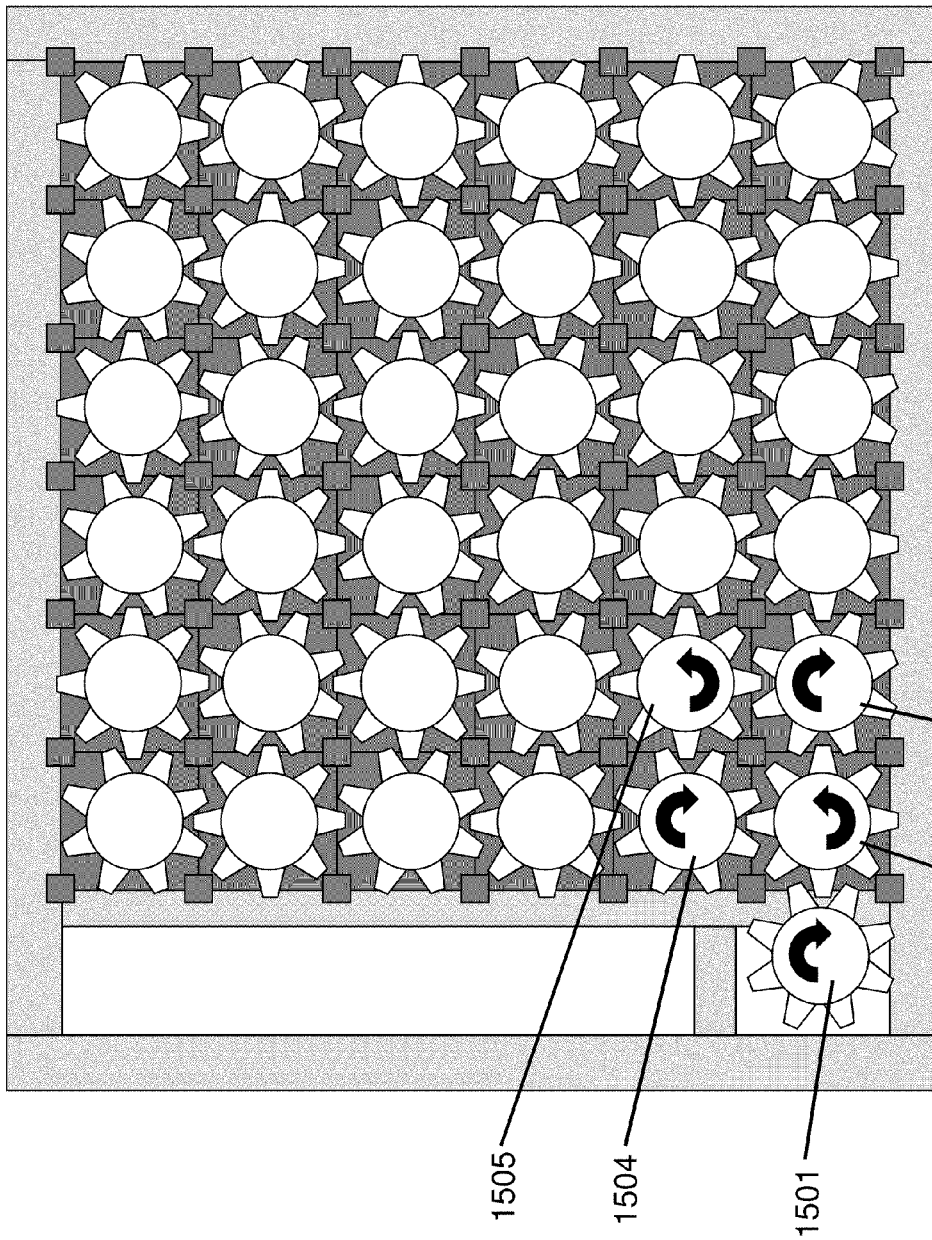
FIG. 15 illustrates a gearing arrangement for simultaneously focusing all of the lenses in a coded lens array in accordance with one embodiment of the invention.

FIG. 15 illustrates an arrangement of gears with hollow centers within a coded lens array, each gear rotating around either a lens (if the location is a transparent aperture) or rotating over an opaque aperture without a lens. (For the sake of illustration, the teeth of adjacent gears are not touching each other, but in practice they would typically fit together snugly.) Gear 1501 is coupled to the shaft of an electric motor, which is either manually controlled or is controlled by an auto-focus mechanism. As the electric motor turns, it turns gear 1501, which in turn transfers the rotational motion to all the gears in the coded lens array. By way of example, if gear 1501 turns clockwise, it turns gear 1502 counterclockwise, which then turns gears 1503 and 1504 both clockwise, and then gears 1503 and 1504 both turn gear 1505 counter-clockwise. Extending this example, it can be seen that the motion of gear 1501 turns all of the gears in the coded lens array, with each successive gear in the horizontal or vertical direction turning the opposite way.

Figure 16:
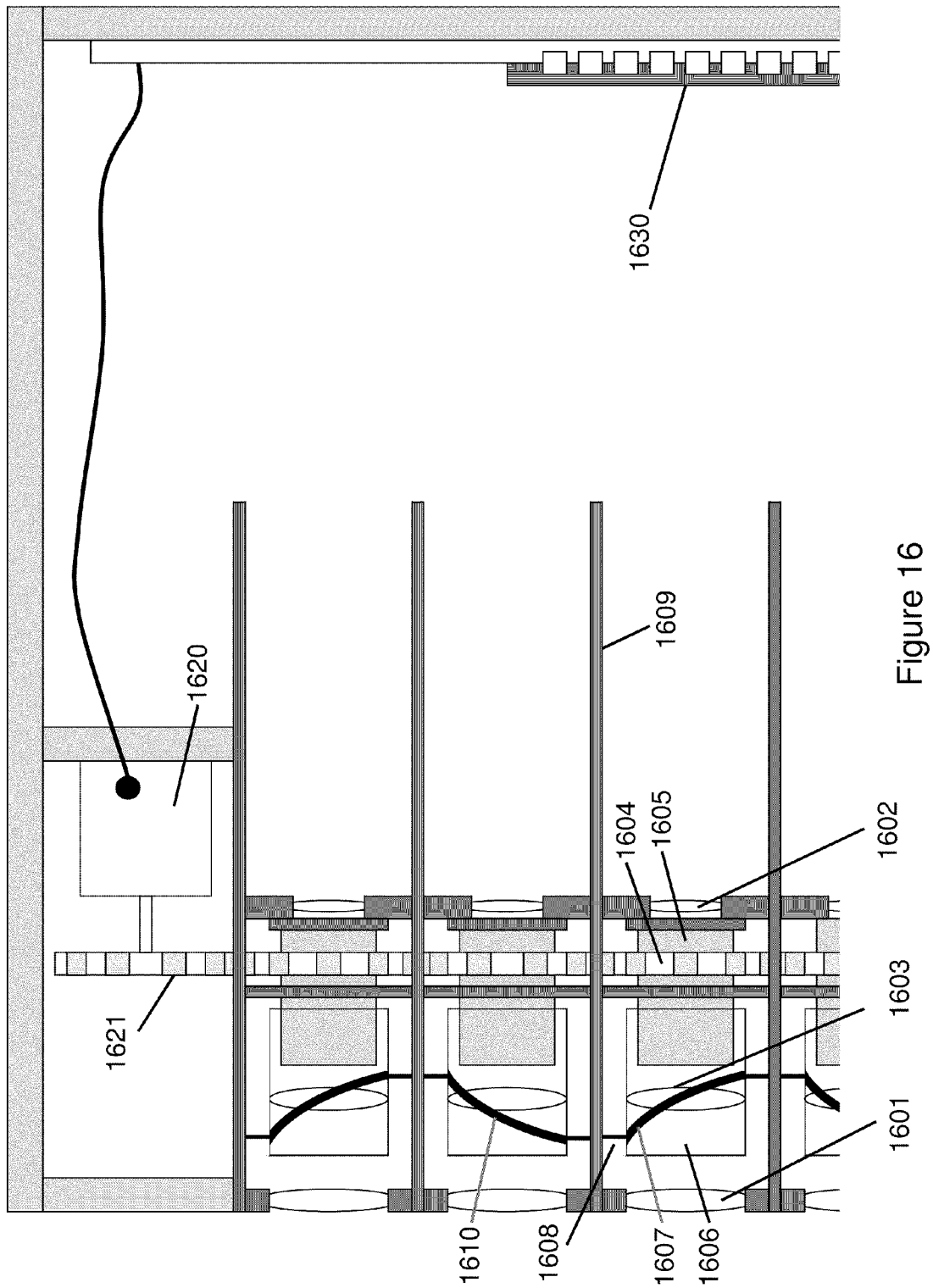
FIG. 16 illustrates a side view of a multi-element coded lens system with a gearing system for simultaneously focusing all the lenses in a coded lens array in accordance with one embodiment of the invention.

FIG. 16 shows a side view of a three-element coded lens array utilizing the gearing system shown in FIG. 15. For the purposes of illustration, all lens array positions are shown with lenses. In practice, opaque lens array positions would not have lenses and would have their apertures closed so they block light. In this embodiment, each lens array position has two fixed lenses 1601 and 1602, and one lens 1603 that translates back-and-forth along the optical axis.

Electric motor 1620 is powered by either a manual or auto-focus means, and it turns gear 1621, which in turn drives the other gears in the coded lens array, as previously described in FIG. 15, including FIG. 16's gear 1604. Gear 1604 turns hollow cylinder 1605, which in turn drives hollow cylinder 1606, which holds lens 1603. Hollow cylinder 1606 is coupled to hollow cylinder 1605 in such a way that it is able to translate back-and-forth along the optical axis (left-to-right as shown in FIG. 16). Hollow cylinder 1606 has screw thread 1607 on its outside surface, which notches pins such as pin 1608 that are secured to structure 1609. As hollow cylinder 1606 rotates, screw thread 1607 causes it to translate back-and-forth along the optical axis.

As can be seen in FIG. 15, each subsequent gear in the coded lens array rotates in the opposite direction. As a result each subsequent hollow cylinder holding a lens is threaded with the opposite pitch, such as screw thread 1610 has opposite pitch of screw thread 1607. In this way, the middle lenses of the lens array all move in the same direction when the electric motor 1620 actuates gear 1621, despite the fact each other gear position is rotating in an opposite direction.

In this embodiment, the same structure 1609 that holds the lens array mechanism continues behind the lenses to form the baffles. Such structure 1609 may be made of a metal such as aluminum, plastic, or any other sufficiently sturdy, but light-opaque material. Note that FIG. 16 shows a side view, but in practice the baffle form a box around the perimeter of each transparent aperture, and function to limit the FOV of the projection from each lens stack that projects onto sensor 1630.

Sensor Pixel Size and Lens Size

Unlike in coded aperture imaging where sensor pixel size and aperture element size are typically chosen such as to be in the same order of magnitude, in coded lens imaging the individual lenses may be much larger than the sensor pixel size.

In one embodiment, the sensor pixel size is chosen such as to be in the same order of magnitude as the resolution of the coded lens array. It should be noted that this resolution is determined by the diffraction patterns of the individual lenses. If the sensor pixel size is chosen significantly larger than the size of the diffraction patterns, resolution of the imaging system is wasted. If, on the other hand, the sensor pixel size is chosen significantly smaller than the size of the diffraction patterns, no additional usable information is gained.

Regarding the choice of the lens size it should be noted that there is a tradeoff between the size of the diffraction patterns and the achievable DOF. The smaller a lens is chosen, the larger its diffraction pattern and the better its DOF. It is important to note, however, that there is a degree of freedom in the choice of the lens size in order to achieve the best compromise between resolution and DOF of a specific application. In coded aperture imaging, however, this degree of freedom does not exist. Rather, in coded aperture imaging the sensor pixel size and aperture element size are constrained to be more or less identical.

Camera Sensor and Sensor Output Adjustments

Figure 9:
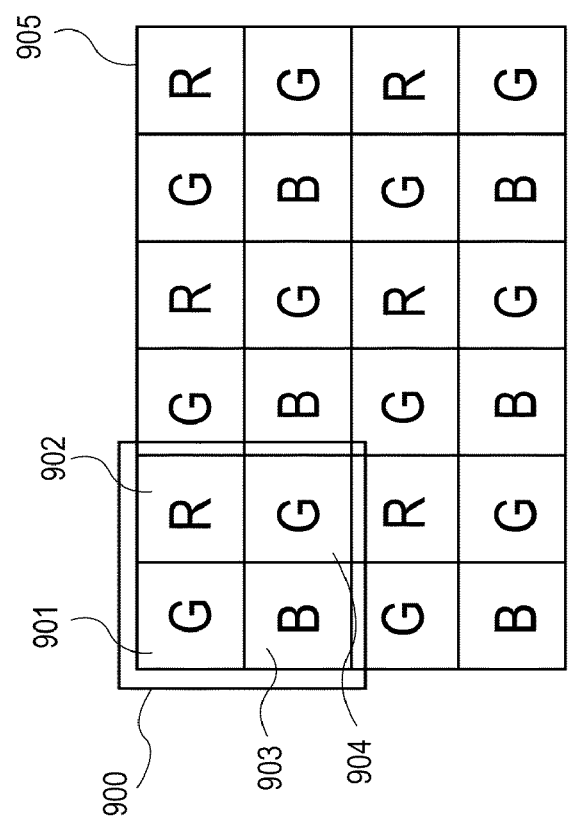
FIG. 9 illustrates an exemplary RGB Bayer Pattern employed in one embodiment with the invention.

According to one embodiment, the sensor 504 of FIG. 5 is a CCD sensor. More specifically, a color CCD sensor using a color filter array ("CFA"), also know as a Bayer pattern, is used for color imaging. A CFA is a mosaic pattern of red, green and blue color filters placed in front of each sensor pixel, allowing it to read out three color planes (at reduced spatial resolution compared to a monochrome CCD sensor). FIG. 9 illustrates an exemplary RGB Bayer Pattern. Each pixel cluster 900 consists of 4 pixels 901-904, with color filters over each pixel in the color of (G)reen, (R)ed, or (B)lue. Note that each pixel cluster in a Bayer pattern has 2 Green pixels (901 and 904), 1 Red (902) and 1 Blue (903). Pixel Clusters are typically packed together in an array 905 that makes up the entire CFA. It should be noted, however, that the underlying principles of the invention are not limited to a Bayer pattern.

Figure 10:
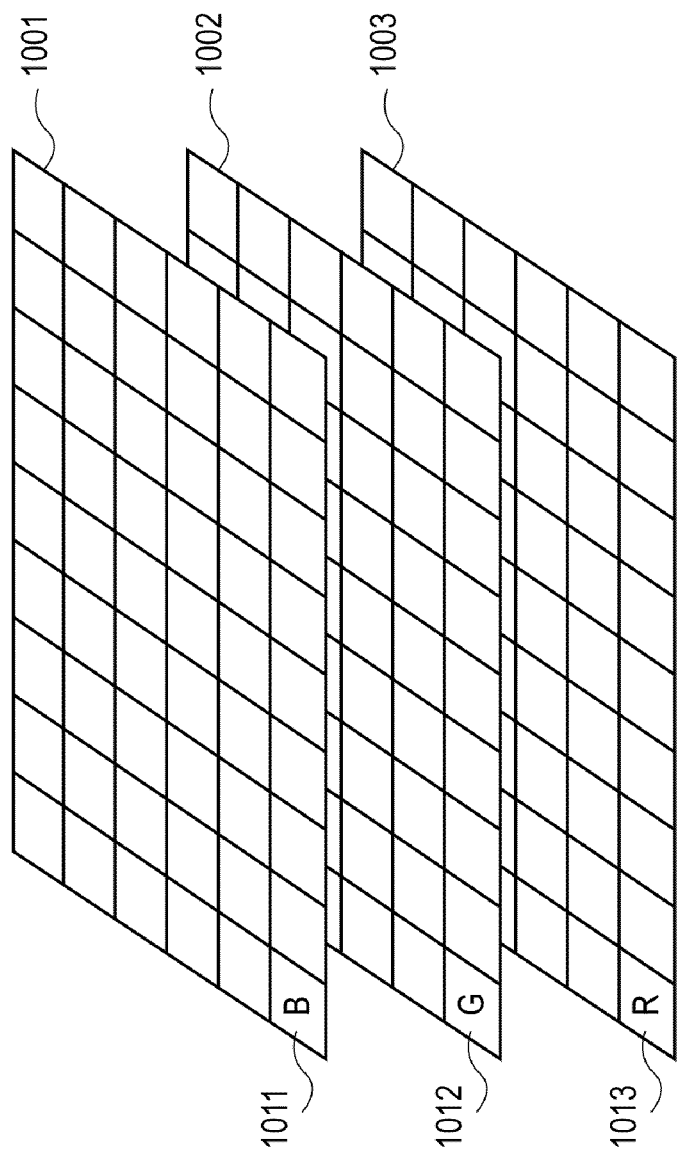
FIG. 10 illustrates image sensors implemented as a multi-layer structure and used in one embodiment of the invention.

In an alternative embodiment, a multi-layer color image sensor is used. Color sensors can be implemented without color filters by exploiting the fact that subsequent layers in the semiconductor material of the image sensor absorb light at different frequencies while transmitting light at other frequencies. For example, Foveon, Inc. of Santa Clara, Calif. offers "Foveon X3" image sensors with this multi-layer structure. This is illustrated in FIG. 10 in which semiconductor layer 1001 is an array of blue-sensitive pixels, layer 1002 is an array of green-sensitive pixels, and layer 1003 is an array of red-sensitive pixels. Signals can be read out from these layers individually, thereby capturing different color planes. This method has the advantage of not having any spatial displacement between the color planes. For example, pixels 1011-1013 are directly on top of one another and the red, green and blue values have no spatial displacement between them horizontally or vertically.

According to one embodiment of the present invention, each of the 3 RGB color planes are read out from a color imaging sensor (CFA or multi-layer) and are reconstructed individually. In one embodiment, the reconstruction algorithms detailed below are applied individually to each of the 3 color planes, yielding 3 separate color planes of the reconstructed image. These can then be combined into a single RGB color image.

Figure 11A:
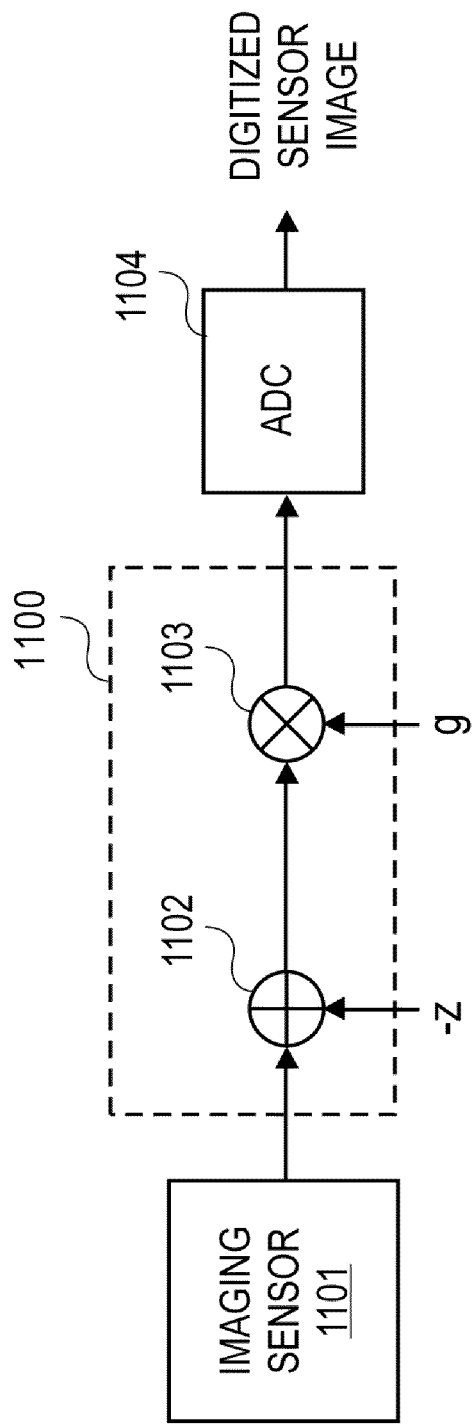
FIG. 11a illustrates one embodiment of the invention in which an output signal is digitized by an analog-to-digital converter (A/D) in order to allow digital image reconstruction and post-processing.

As illustrated in FIG. 11a, the analog output signal of imaging sensor 1101 is digitized by an analog-to-digital converter (A/D) 1104 in order to allow digital image reconstruction and post-processing. In order to exploit the full dynamic range of the A/D 1104, the sensor output is first amplified by an op amp 1100 before feeding it into the A/D. The op amp 1100 applies a constant zero offset z (1102) and a gain g (1103) to the image sensor 1101 output signal. The input signal to the A/D 1104 is s'=g (s−z) where s is the image sensor 1101 output signal. In one embodiment, offset 1102 and gain 1103 are chosen in such a way that the full dynamic range of the A/D 1104 is exploited, i.e., that the lowest possible sensor signal value $s_{min}$ corresponds to zero and the highest possible sensor signal value $s_{max}$ corresponds to the maximum allowed input signal of the A/D 1104 without the A/D 1104 going into saturation.

Figure 11B:
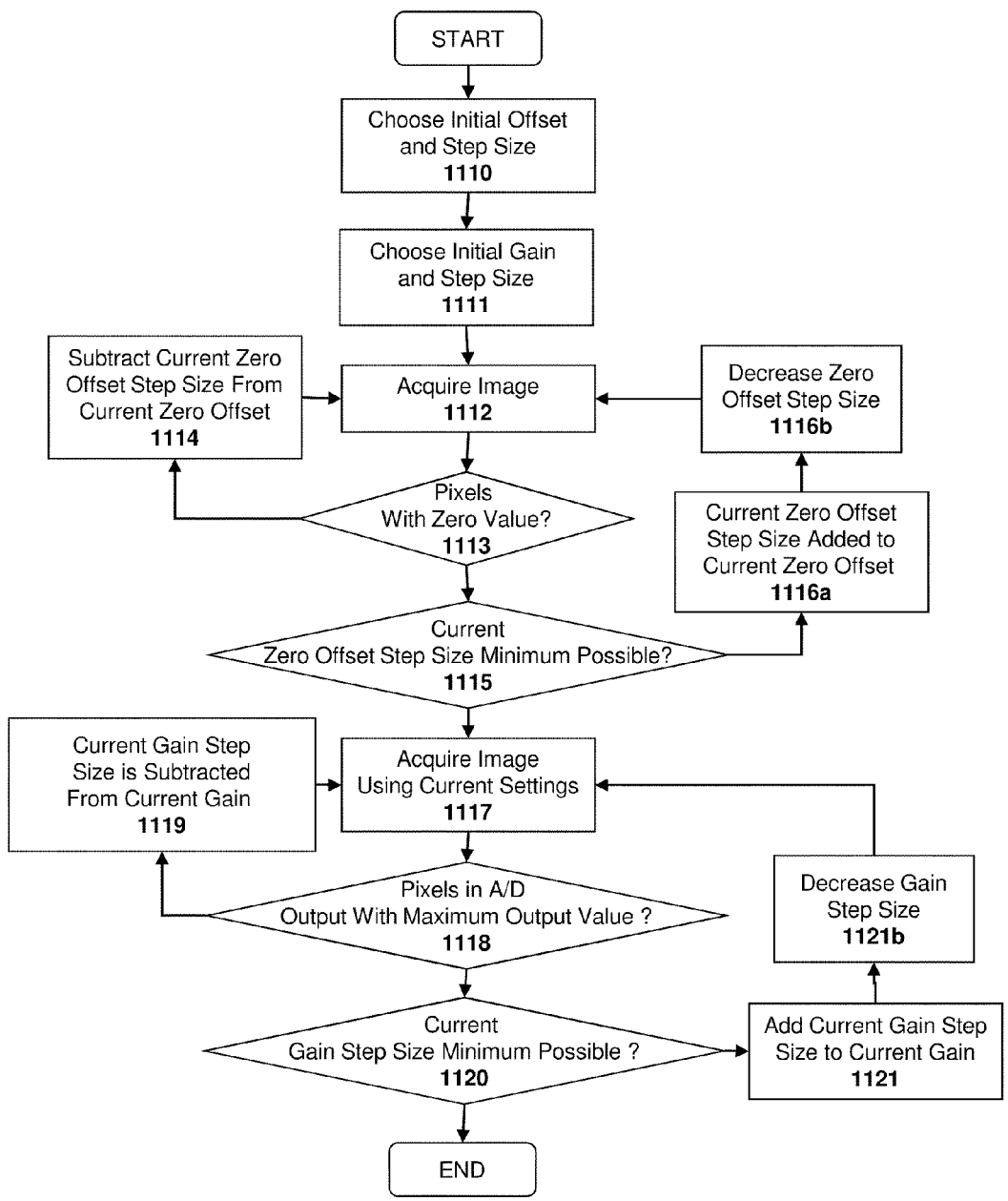
FIG. 11b illustrates a process for selecting zero offset and gain in accordance with one embodiment of the invention.
Figure 12:
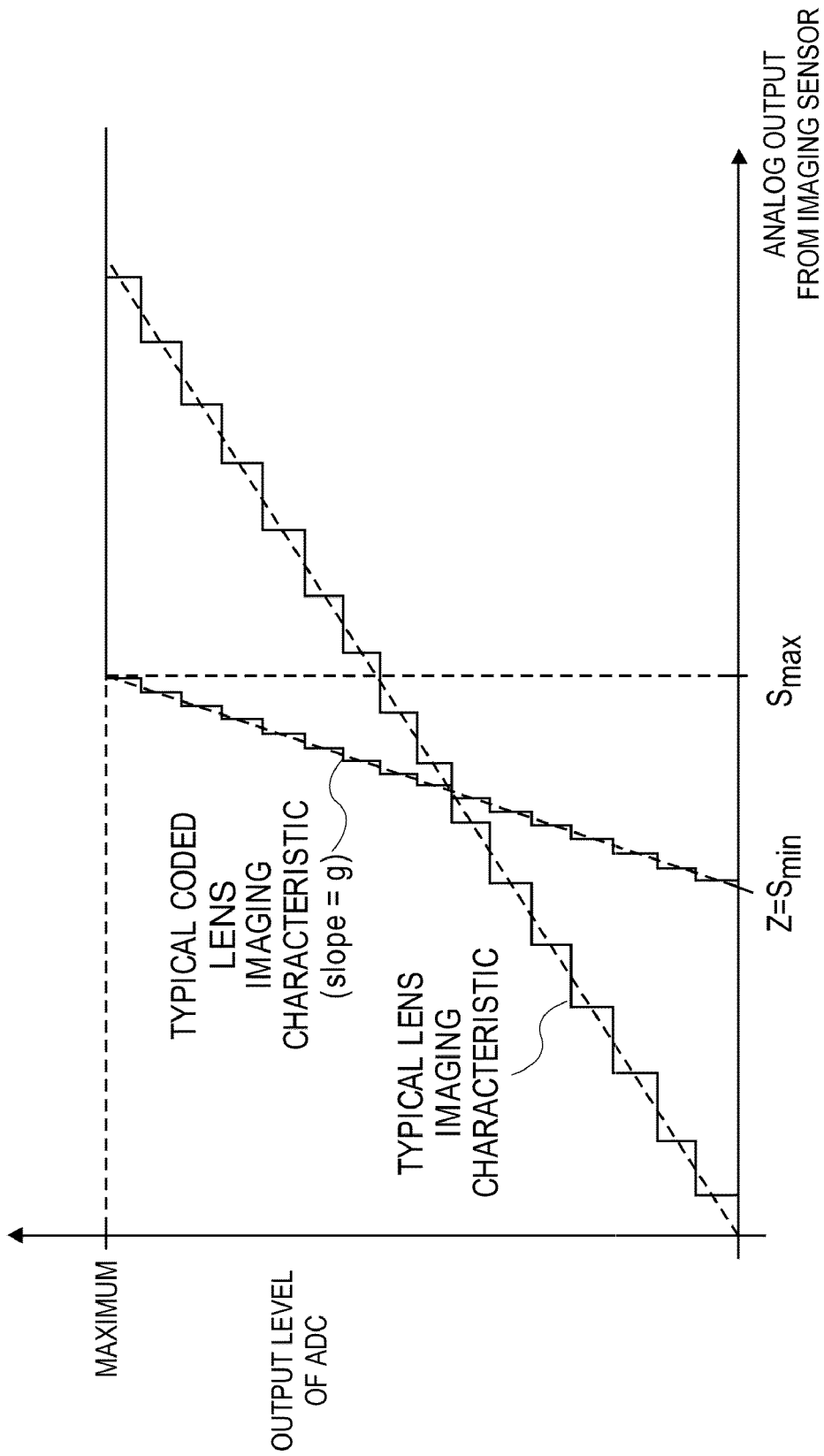
FIG. 12 illustrates a coded lens imaging characteristic and a typical lens imaging characteristic.

FIG. 12 depicts the characteristic of the resulting system. Note that as described above, the dynamic range of the scene is compressed by coded lens imaging; therefore, zero offset and gain may be higher than in conventional imaging with a single lens. In one embodiment, zero offset and gain are automatically chosen in an optimal fashion by the coded lens camera according to the following set of operations, illustrated in the flowchart in FIG. 11*b*:

At 1110, an initial zero offset is selected as the maximum possible zero offset and a relatively large initial step size is selected for the zero offset. At 1111 an initial gain is selected as the maximum possible gain and a relatively large initial step size is selected for the gain.

At 1112, an image is acquired using the current settings and a determination is made at 1113 as to whether there are any pixels in the A/D output with a zero value. If there are pixels with a zero value, then the current zero offset step size is subtracted from the current zero offset at 1114 and the process returns to 1112.

Otherwise, if there are no pixels with a zero value, a check is made at 1115 as to whether the current zero offset step size is the minimum possible step size. If this is not the case, then at 1116*a*, the current zero offset step size is added to the current zero offset, making sure that the maximum possible zero offset is not exceeded. The current zero offset step size is then decreased at 1116*b* (e.g., by dividing it by 10) and the process returns to 1112.

Otherwise, at step 1117, an image is acquired using the current settings. At 1118, a determination is made as to whether there are any pixels in the A/D output with the maximum output value (e.g. 255 for an 8-bit A/D). If there are pixels with the maximum value, then the current gain step size is subtracted from the current gain at 1119 and the process returns to 1117.

Otherwise, at 1120, a determination is made as to whether the current gain step size is the minimum possible step size. If this is not the case, then at 1121*a*, the current gain step size is added to the current gain, making sure the maximum possible gain is not exceeded. The current gain step size is then decreased at 1121*b* (e.g., by dividing it by 10) and the process returns to 1117. Otherwise, the process ends with the current zero offset and gain settings.

Before applying the reconstruction algorithm, the effects of zero offset and gain have to be reversed. In one embodiment, this is done by digitally computing the corrected sensor signal s* from the A/D output signal s" whereas s" is the output of the A/D pertaining to the A/D input signal s' and s*=s"/g+z. Note that in the absence of noise in the op amp 1100 and in the absence of quantization errors, s* would equal the original analog sensor output signal s.

Figure 13:
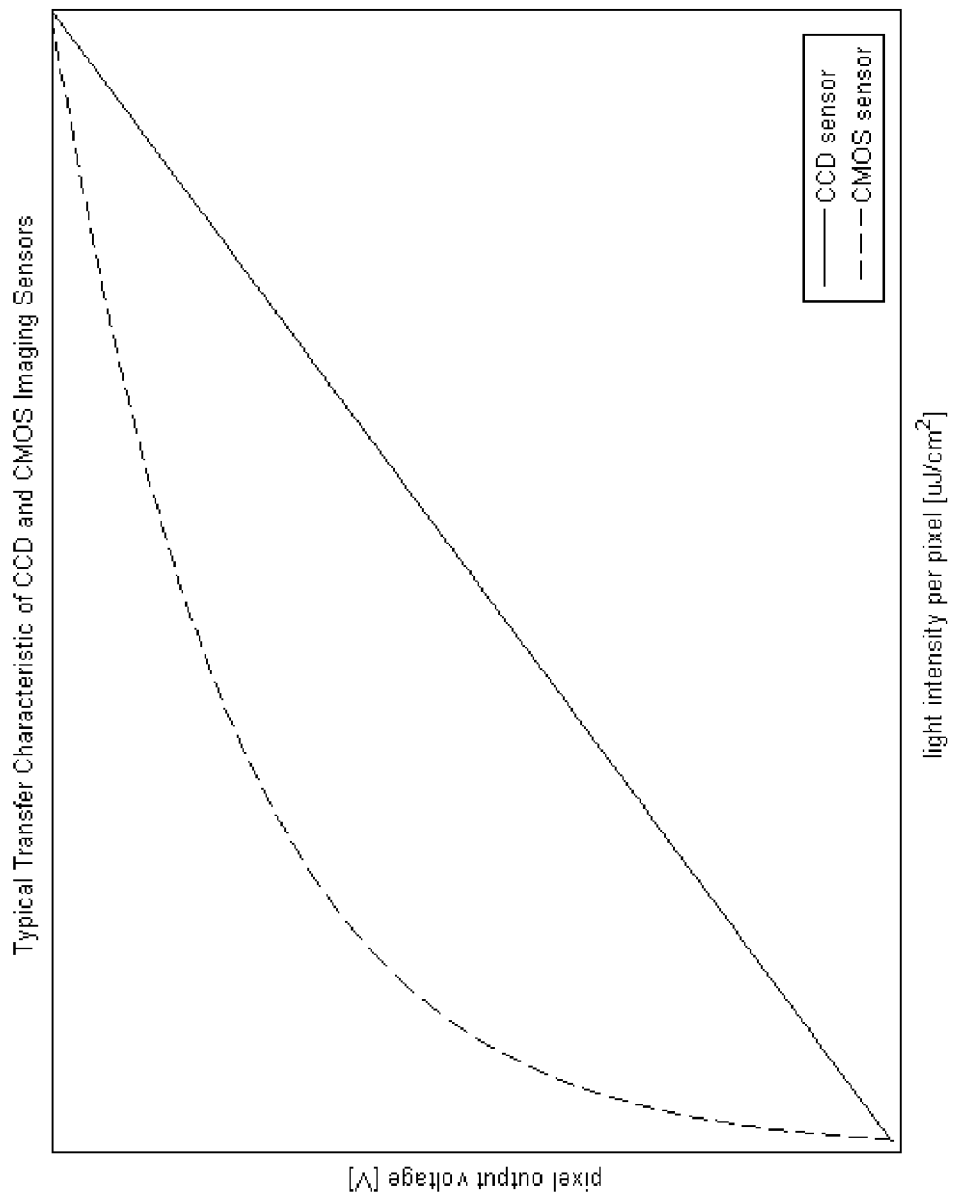
FIG. 13 illustrates a graph showing typical CMOS and CCD image sensor transfer characteristics.

In coded lens imaging, each sensor pixel is exposed to light emitted by different pixels of the scene, reaching the sensor pixel through different lenses within the coded lens array. The reconstruction algorithms used in coded lens imaging assume that sensor image is the linear sum of all sensor images which each individual lens would have projected onto the sensor. Therefore, in one embodiment, the sensor output signal s is an exactly linear function of the number p of photons hitting each sensor pixel during the exposure time. The function describing the dependency of the sensor output signal from the actual photon count of each sensor pixel is called the "transfer characteristic" of the sensor. CCD imaging sensors have a linear transfer characteristic over a large range of intensities while CMOS imaging sensors have a logarithmic transfer characteristic. A graph showing typical CMOS and CCD image sensor transfer characteristics is shown in FIG. 13. When the transfer characteristic s=f (p) of the sensor is known, it can be compensated for by means of a lookup table. That is, instead of using the value s* for the reconstruction, the value LUT (s*)=LUT (s"/g+z) is used where LUT is a lookup table compensating for any non-linear effects in the sensor transfer characteristic. Once the operations above have been completed, the adjusted sensor image is stored in the memory of the DSP, ASIC or other type of image reconstruction processor 530 of the camera in preparation for image reconstruction.

It should be noted that in coded lens photography, the dynamic range of the sensor signal may be different from the dynamic range of the imaged scene. Since each sensor pixel is exposed to multiple scene pixels across the entire FOV, the coded lens array has an averaging effect on the range of intensities. Even scenes with a high dynamic range (e.g. dark foreground objects and bright background objects) produce sensor signals with a lower dynamic range. In the process of image reconstruction, the dynamic range of the original scene is reconstructed independently of the dynamic range of the imaging sensor. Rather, the limited dynamic range of the imaging sensor (finite number of bits for quantization) leads to quantization errors which can be modeled as noise in the sensor image. This quantization noise also causes noise in the reconstruction. The noise is more prominent close to the edges of the reconstructed image as described above, since in these areas a high multiplier must be applied for compensating for baffle attenuation. As a result, imaging a scene with high dynamic intensity range with an imaging sensor with low dynamic range causes the reconstructed image to be more noisy, but not to have lower dynamic range. This is in contrast to conventional single lens photography where the dynamic range of the imaging sensor directly limits the maximum dynamic range of the scene which can be imaged.

Scene Reconstruction

The following set of operations are used in one embodiment of the invention to reconstruct scenes from sensor images that are captured and adjusted as described above. According to Gottesman, a MURA lens array is constructed in the following way. First consider a Legendre sequence of length p where p is an odd prime. The Legendre sequence l(i) where i=0, 1, . . . , p−1 is defined as:

$l(0)=0$, $l(i)=+1$ if for any k=1, 2, . . . , p−1 the relation $k^2$ mod p=1 is satisfied $l(i)=-1$ otherwise.

Then the MURA a (i, j) of size p×p is given by:

$a(0,j)=0$ for j=0,1, . . . , p−1, $a(i,0)=1$ for i=1,2, . . . , p−1, $a(i,j)=(l(i)*l(j)+1)/2$ for i=1,2, . . . , p−1 and j=1, 2, . . . , p−1.

In this MURA array, a 1 represents a lens and a 0 represents an opaque element in the coded lens array. The number of lenses in a single period of this MURA is $K=(p^2-1)/2$. The periodic inverse filter $g(i, j)$ pertaining to this MURA is given by:

$g(0,0)=+1/K,$ $g(i,j)(2a(i,j)-1)/K$ if $i>0$ or $j>0$.

It can be shown that the periodic cross-correlation function phi (n, m) between a (i, j) and g (i, j) is 1 for n=0 and m=0, and 0 otherwise. The periodic inverse filter pertaining to a MURA therefore has the same structure as the MURA itself, except for a constant offset and constant scaling factor, and for the exception of a single element which is inverted with respect to the original MURA. FIG. 2 shows various sizes of MURA lens array patterns.

In a similar manner, a PBA according to Busboom can be used as a lens array. Its periodic inverse filter has exactly the same structure as the PBA itself, except for a constant offset and constant scaling factor. The formulas and algorithms for generating PBAs can be found in A. BUSBOOM: ARRAYS UND REKONSTRUKTIONSALGORITHMEN FUER BILDGEBENDE SYSTEME MIT CODIERTER APERTUR. VDI VERLAG, DUESSELDORF, 1999, ISBN 3-18-357210-9, PAGES 52-56. PBAs of order 8 and 24 are illustrated in FIG. 2. They are enlarged relative to the MURA patterns.

When an object at a constant distance is imaged with a coded lens array, the sensor image is given by the periodic cross-correlation function of the object function with the coded lens array, magnified by a geometric magnification factor f as described above. For reconstructing the original object, the periodic cross-correlation function of the measured sensor image with an appropriately magnified version of the periodic inverse filter is computed. In the absence of noise and other inaccuracies of the measured sensor image, the result equals the original object function.

Performing the inverse filtering then consists of the following set of operations:

1. Compute the periodic inverse filter pertaining to the coded lens array pattern.
2. Compute a geometrically magnified version of this inverse filter in such a way that the distance between two adjacent elements of the inverse filter equals the separation of two adjacent lens projections of the scene in the sensor plane. The magnified version of the inverse filter is resampled according to the sensor resolution in such a way that all values between two filter elements are padded with zeros and the filter elements are represented as non-zeros peaks, each having the size of a single pixel. According to one embodiment of the invention, if the distance between two adjacent lens projections is not an integer multiple of the pixel size, standard interpolation techniques known from signal processing are used in order to compute the magnified version of the inverse filter. In this case, each filter element may spread across more than one pixel. It should be noted that the separation between two adjacent lens projections varies with the distance of the object from the coded lens camera. Therefore, different inverse filters may be used in order to reconstruct objects at different distances.
3. Compute the two-dimensional, periodic cross-correlation function between the sensor image and the inverse filter, resampled to the sensor resolution according to step (2).
4. Divide each pixel of the result of 3. by K, the number of lenses in a single period of the MURA or PBA or other lens array pattern.

Reconstruction of a Scene with One Object at a Known Range

As mentioned above, in one embodiment, reconstruction of the scene from the sensor signal is performed in a digital signal processor ("DSP") (e.g., DSP 132) integrated into the camera or in a computing device external to the camera. In one embodiment, scene reconstruction consists of the following sequence of operations:

1. Linearize the transfer characteristic of the output signal of the sensor such that the linearized output signal of each sensor pixel is proportional to the number of photons counted by the sensor pixel.
2. Periodically cross-correlate the sensor signal with the appropriately magnified periodic inverse filter pertaining to the coded lens array.
3. Clip the result to non-negative pixel values.
4. Compensate for baffle attenuation by multiplying each pixel with an appropriate amplification factor.
5. Optionally smooth the off-axis parts of the result which are more subject to noise amplification during (4) than the center part of the result.

It should be noted that if the aperture array is a MURA, the inverse filtering of operation (2) can be decomposed into a sequence of two one-dimensional filter operations, one of which is applied per image row and the other of which is applied per image column. This decomposition may reduce the computational complexity of (2) in the case of large array orders.

Figure 17A:
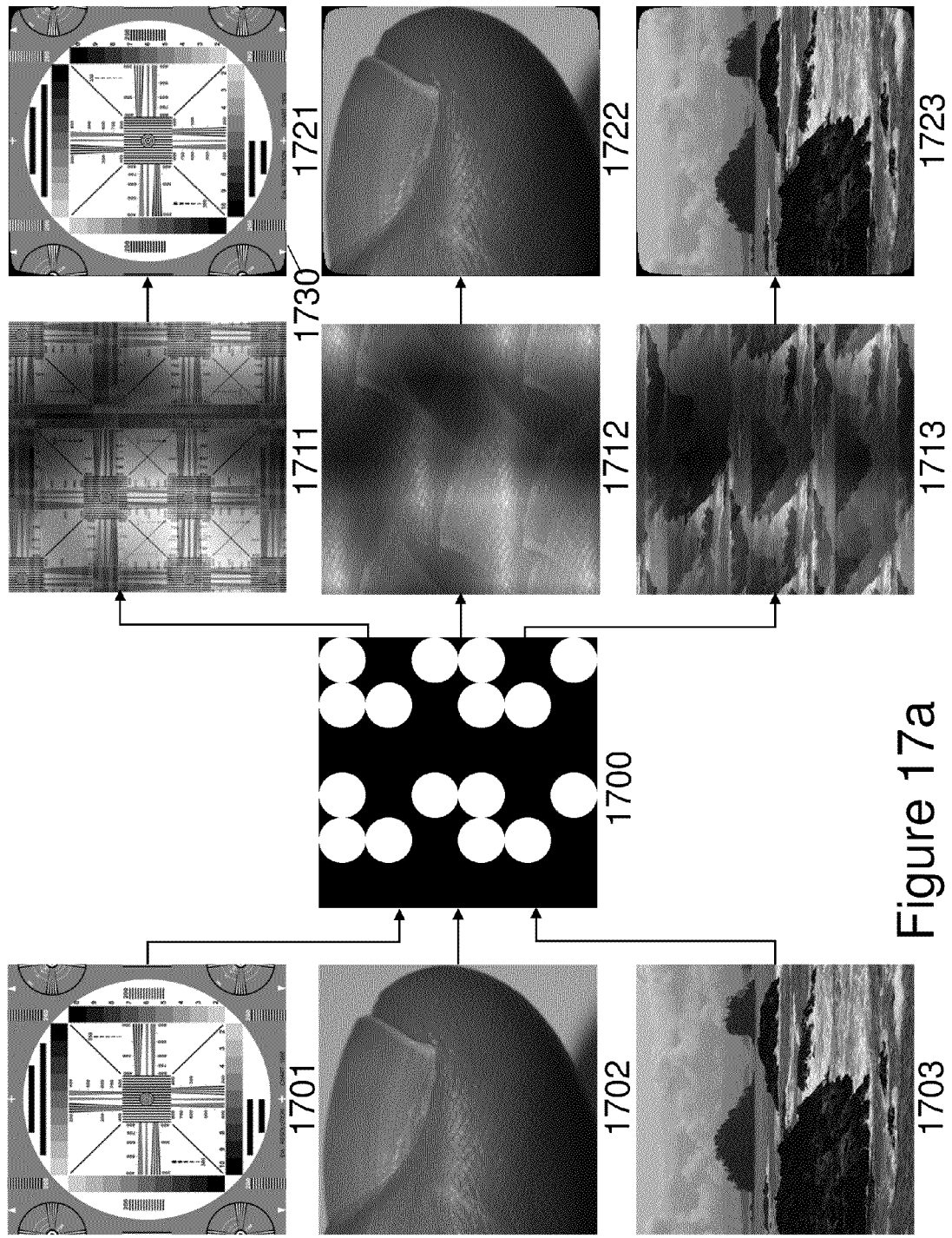
FIG. 17a illustrates three examples of a projection and reconstruction of three flat scenes at a known range using a MURA 3 coded lens array in accordance with one embodiment of the invention.

FIG. 17a illustrates three examples of the projection and reconstruction of three flat scenes at a known range using the procedure described in the preceding paragraph. In the example, a 3×3 MURA pattern was used for the lens array (1700). The distance (pitch) between two adjacent lenses in the array was 3 mm. Each lens had a focal length of 5 mm which was also the distance between the lens array and the sensor. The sensor was a 10×10 mm sensor with 30×30 um square pixels. Scene 1701 is a flat (2-dimensional) test pattern of 307×307 pixels. It is projected through the 3×3 element MURA lens array 1700 onto the image sensor, resulting in the sensor image 1711. Sensor image 1711 is adjusted and reconstructed per the process described above resulting in reconstruction 1721. Note that the extreme corners 1730 of reconstruction 1721 are not accurately reconstructed. This is due to the attenuation of light during the projection through the baffles at the extreme edges of the image. In the same manner, flat 307×307 pixel image 1702 is projected through the lens array 1700 resulting in sensor image 1712 and is processed to result in reconstruction 1722. In the same manner, flat 307×307 pixel image 1703 is projected through the lens array 1700 resulting in sensor image 1713 and is processed to result in reconstruction 1723.

Figure 17B:
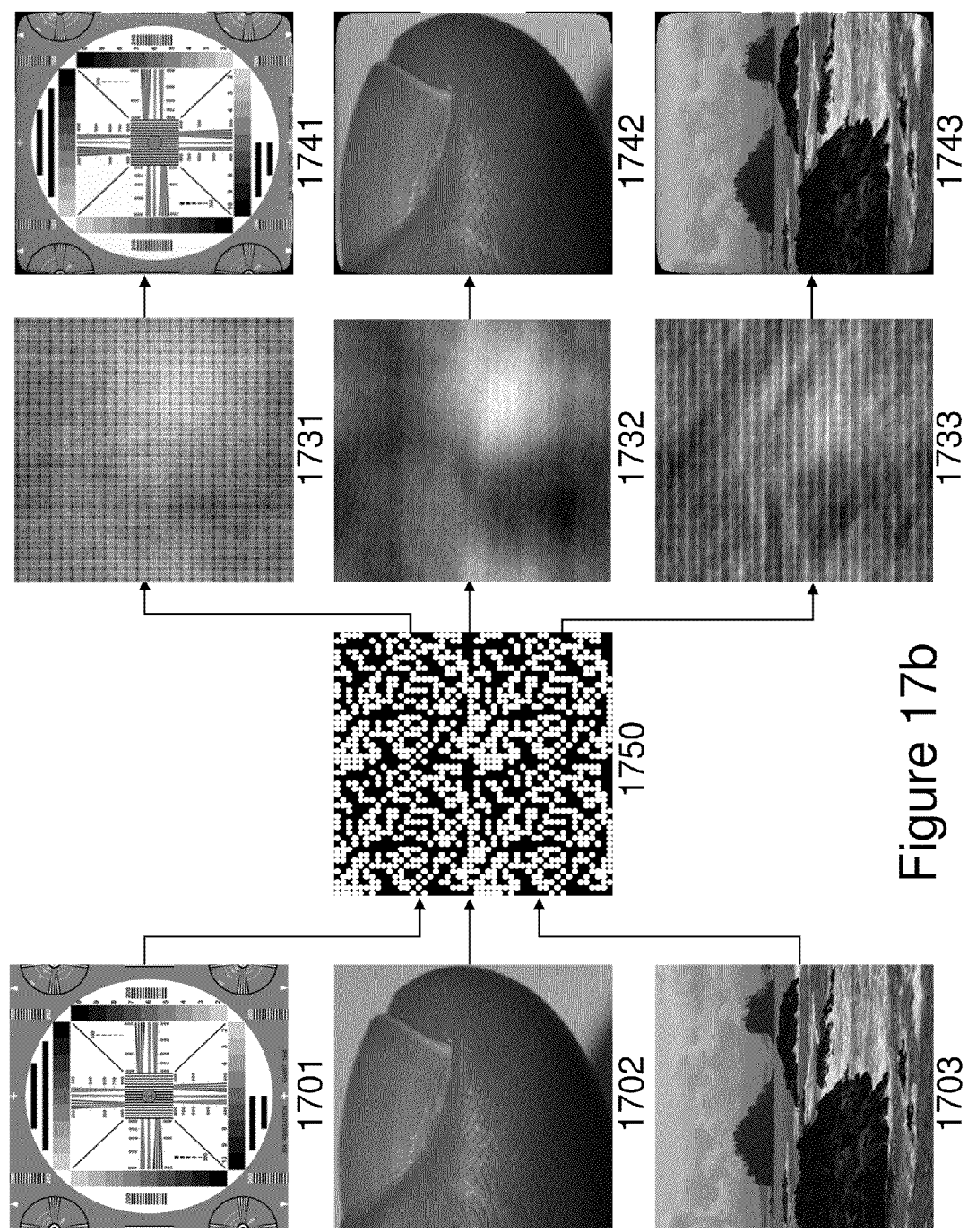
FIG. 17b illustrates three examples of a projection and reconstruction of three flat scenes at a known range using a PBA 24 coded lens array in accordance with one embodiment of the invention.

FIG. 17b illustrates three similar examples as FIG. 17a. However, in FIG. 17b a 24×24 PBA pattern was used as the lens array pattern (1750). The lenses had a pitch of 0.39 mm such that the total size of the lens array was similar to that of FIG. 17a (18.72×18.72 mm in FIG. 17b and 18×18 mm in FIG. 17a). The same sensor as in the example of FIG. 17a was used. The lenses had again a focal length of 5 mm. Scene 1701 is projected through the 24×24 element PBA lens array 1750 onto the image sensor, resulting in the sensor image 1731. Sensor image 1731 is adjusted and reconstructed per the process described above resulting in reconstruction 1741. In the same manner, flat 307×307 pixel image 1702 is projected through the lens array 1750 resulting in sensor image 1732 and is processed to result in reconstruction 1742. In the same manner, flat 307×307 pixel image 1703 is projected through the lens array 1750 resulting in sensor image 1733 and is processed to result in reconstruction 1743. It can be observed from the sensor images (1711-1713 and 1731-1733) in the two examples that increasing the order of the lens array flattens the contrast in the sensor image. In the sensor images 1731-1733 of FIG. 17*b*, no more details of the original scene are recognizable. However, as can be seen from the reconstructions 1741-1743, the sensor images still contain all the information necessary for reconstructing the original scene.

It is noted that, as described above, sensor images 1711-1713 and 1731-1733 may be quantized at a given number of bits per pixel (e.g. 8), but may yield in the reconstructed images 1721-1723 and 1741-1743 an image with a useful dynamic range comparable to a higher number of bits per pixel (e.g. 10).

Reconstruction of a Scene with One Object at an Unknown Range

In one embodiment, operation (2) of the sequence of operations described above in section "Reconstruction of a Scene with One Object at a Known Range" are repeated for different expected object ranges o, when the true object range is uncertain or unknown. By this technique a set of multiple reconstructions is obtained from the same sensor signal. Within this set of reconstructions, the one where the expected object range is identical with or closest to the true object range will be the most accurate reconstruction of the real scene, while those reconstructions with a mismatch between expected and true range will contain artifacts. These artifacts will be visible in the reconstruction as high-frequency artifacts, such as patterns of horizontal or vertical lines or ringing artifacts in the neighborhood of edges within the reconstruction.

According to one embodiment of the present invention, among this set of reconstructions, the one with the least artifacts is manually or automatically selected. This allows a change in the range of reconstruction without the need to pre-focus the camera and, in particular, without the need to mechanically move parts of the camera, as would be required with a conventional single lens camera, or to pre-select an expected object range. Further, this allows the user to decide about the desired range of reconstruction after the image acquisition (i.e. retrospectively). Preferably, the range of reconstruction is automatically selected from the set of reconstructions by identifying the reconstruction with the least amount of high-frequency artifacts and the smoothest intensity profile.

A simple, but highly effective criterion for "focusing" a coded lens camera, i.e., for determining the correct range from a set of reconstructions, is to compute the mean m and the standard deviation $\sigma$ of all gray level values of each reconstruction. Further, the ratio $m/\sigma$ is computed for each reconstruction. The reconstruction for which this ratio takes on its maximum is chosen as the optimal reconstruction, i.e., as the reconstruction which is "in focus." This technique produces the best results if the objects in the scene are in focus in each of the individual projections.

FIG. 18 illustrates how a scene is reconstructed at a set of different ranges. A similar system configuration as in FIG. 17*b* was used for producing FIG. 18, i.e. a 24×24 PBA pattern was used for projection. The original scene was the test image 1701 from FIG. 17*b* which was imaged at a range of 1,000 mm. Reconstructions were computed from the resulting sensor image at assumed ranges of 500 mm (1801), 800 mm (1802), 1,000 mm (1803) and 5,000 mm (1804). In the figure, it can clearly be seen that the reconstruction in the lower left-hand corner at the correct range of 1,000 mm looks "clean" while the reconstructions at different ranges contain strong high-frequency artifacts. FIG. 18 also shows the standard deviation ("stddev") of the gray values in each of the four reconstructions. FIG. 18 further shows the quotients (m/s) of the gray value mean, divided by the gray value standard deviation, for each of the four reconstructions. This value starts at 0.0977 at an assumed range of 500 mm, then continuously increases to a maximum of 2.0 at the correct range of 1,000 mm, then continuously decreases, reaching a value of 0.1075 at an assumed range of 5,000 mm. The example shows how the true range of the scene can be easily computed from a set of reconstructions by choosing the reconstruction at which the quotient m/s takes on its maximum.

Optimization of Reconstruction of a Scene with One Object at an Unknown Range

According to one embodiment, only a partial reconstruction of parts of the image is computed using different expected object ranges o. A partial reconstruction is computed by only evaluating the periodic cross-correlation function in operation (2) above in section "Reconstruction of a Scene with One Object at a Known Range" for a subset of all pixels of the reconstructed image, thus reducing the computational complexity of the reconstruction. This subset of pixels may be a sub-sampled version of the image, a contiguous region of the image, or other suitable subsets of pixels. Then, the two one-dimensional periodic filtering operations only need to be evaluated for a subset of rows and/or columns of the reconstructed image. From the set of partial reconstructions, the one with the least amount of high-frequency artifacts and the smoothest intensity profile is identified in order to determine the true object range o. For the identified true object range o, a full reconstruction is then performed. This way, the computational complexity of reconstructing the scene while automatically determining the true object range o can be reduced.

Reconstruction of a Scene with Multiple Objects at Unknown Ranges

According to one embodiment, a set of full image reconstructions at different object ranges o is computed. Since objects in different parts of the scene may be at different ranges, the reconstructions are decomposed into several regions. For each region, the object range o which yields the least amount of high-frequency artifacts and the smoothest intensity profile is identified. The final reconstruction is then assembled region by region whereas for each region the reconstruction with the optimum object range o is selected. This way, images with infinite depth of FOV (from close-up to infinity) can be reconstructed from a single sensor signal.

The combined reconstruction is of lower quality than a flat reconstruction of a flat scene, i.e., of a scene with only a single object at a single range. The presence of other regions in the scene which are "out of focus" do not only cause the out-of-focus regions to be of inferior quality in the reconstruction, but also cause the in-focus region to contain artifacts in the reconstruction. In other words, there is a "crosstalk" between the out-of-focus and the in-focus regions. This crosstalk and techniques for suppressing it are addressed in the following.

Reduction of "Crosstalk" in Reconstructing a Scene with Multiple Objects at Unknown Ranges As explained before, the "flat" reconstruction of a region $r_1$ at range $o_1$ would only be accurate if the entire scene were at a constant range $o_1$. If, however, other regions are at different ranges, there will be "crosstalk" affecting the reconstruction of region $r_1$. Therefore, according to one embodiment, an iterative reconstruction procedure is employed which eliminates this crosstalk among different regions in the scene at different ranges. The iterative reconstruction procedure according to one embodiment of the invention consists of the following set of operations.

1. Computing a "flat" reconstruction, i.e., a reconstruction assuming a homogeneous range across the entire scene, at a set of ranges $o_1, o_2, \ldots, o_n$.
2. Using the flat reconstructions obtained this way to decompose the scene into a number of contiguous regions $r_1, r_2, \ldots, r_m$ and corresponding ranges $o_1, o_2, \ldots, o_m$. The decomposition is done in such a way that for each region its reconstruction $r_i$ at range $o_i$ is "better", i.e., contains less high-frequency artifacts and has a smoother intensity profile, than all reconstructions of the same region at other ranges.
3. For each of the reconstructed regions $r_i (i=1, 2, \ldots, m)$ computing its contribution $s_i$ to the sensor image. This is done by computing the two-dimensional, periodic cross-correlation function of $r_i$ with the lens array pattern. Note that if the reconstructions of all the regions were perfect, then the sum of all sensor image contributions would equal the measured sensor image s.
4. For each of the reconstructed regions $r_i (i=1, 2, \ldots, m)$ subtracting the sensor image contributions of all other regions from the measured sensor image, i.e., $$\Delta s_i = s - \sum_{k \neq i} s_k$$

Note that each $\Delta s_i (i=1, 2, \ldots, m)$ now contains a sensor image pertaining only to region $r_i$, the contributions of all other regions $r_j$, $j \neq i$, being mostly suppressed. Due to the fact that the reconstruction of the other regions will not be perfect but contain reconstruction errors, there will be some remaining crosstalk, i.e. the $\Delta s_i$ will contain some residual contributions from the other regions. However, this crosstalk is much lower than the crosstalk without computation of a difference sensor image.
5. Utilizing the $\Delta s_i (i=1, 2, \ldots, m)$ to compute a refined reconstruction $r'_i$ for each region at range $o_i$. Optionally, this step can be repeated with a number of different ranges around the initial range $o_j$ in order to also refine the range estimate $o_i$. In this case, for each region the reconstruction and range with the least high-frequency artifacts and the smoothest intensity profile are selected.
6. Optionally, going back to operation (3) for an additional refinement of each region.

Determination of Range of Objects within a Reconstructed Scene

According to one embodiment, the output signal of the coded lens camera (in addition to the two-dimensional image information) also contains range information for each image pixel or for several image regions, as determined from finding the object range o for each region with the least amount of high-frequency artifacts and the smoothest intensity profile. Thus, for every pixel reconstructed in the image, in addition to the reconstruction deriving a single intensity value (for grayscale visible light, infrared, ultraviolet or other single frequency radiation) or three intensity values for visible red, green, blue color light, the reconstruction assigns a z value indicating the distance from the camera to the object at that pixel position in the image. This way, three-dimensional image data can be obtained from a single, two-dimensional sensor signal. Further, the range data allows the camera, an external imaging manipulation system, or the user, utilizing an image manipulation application or system to easily segment the two-dimensional image into different regions pertaining to different parts of the scene, such as separating objects in the foreground of a scene from the background of a scene.

Using Range Information to Eliminate the Need for Blue/Green Screens

Chroma-keying is a technique commonly used in video and photographic production to separate a foreground image from a solid background color. Typically, a "blue screen" or "green screen" is used, which is a very carefully colored and illuminated screen that is placed behind a performer or object while the scene is photographed or captured on video or film. Either in real-time or through post-processing, a hardware or software system separates the presumably distinctively colored foreground image from the fairly uniformly colored background image, so that the foreground image can be composited into a different scene. For example, typically the weatherperson on a TV news show is chroma-keyed against a blue or green screen, then composited on top of a weather map.

Such blue or green screens are quite inconvenient for production. They are large and bulky, they require careful illumination and must be kept very clean, and they must be placed far enough behind the foreground object so as not to create "backwash" of blue or green light onto the edges of the foreground object. Utilizing the principles of the embodiment of the previous paragraph, an image can be captured without a blue or green screen, and the z value provided with each pixel will provide a compositing system with enough information to separate a foreground object from its background (i.e., by identifying which pixels in the scene contain the image of closer objects and should be preserved in the final image, and which pixels in the scene contain the image of further away objects and should be removed from the final image). This would be of substantial benefit in many applications, including photographic, video, and motion picture production, as well as consumer applications (e.g. separating family members in various pictures from the background of each picture so they may be composited into a group picture with several family members).

FIG. 20 shows how a person 1901 from FIG. 19 can readily be placed in a scene with a different background, such as the castle 2002 with the background mountains 2002 removed from the picture. This is simply accomplished by replacing every pixel in the image reconstructed from FIG. 19 that has a z value greater than that of person 1901 with a pixel from the image of the castle 2002. Once again, the processing of z values may be implemented using virtually any type of image processor including, for example, a DSP, ASIC or a general purpose processor.

Using Range Information to Improve Optical Motion Capture Systems

The per-pixel distance ranging capability of one embodiment also has applications in optical performance motion capture ("mocap"). Mocap is currently used to capture the motion of humans, animals and props for computer-generated animation, including video games (e.g. NBA Live 2005 from Electronic Arts of Redwood City, Calif.), and motion pictures (e.g. "The Polar Express", released by the Castle Rock Entertainment, a division of Time Warner, Inc, New York, N.Y.). Such mocap systems (e.g. those manufactured by Vicon Motion Systems, Ltd. of Oxford, United Kingdom) typically utilize a number of single lens video cameras surrounding a performance stage. Retroreflective markers (or other distinctive markings) are placed all over the bodies of performers and upon props. The video cameras simultaneously capture images of the markers, each capturing the markers within its FOV that is not obstructed. Finally, software analyzes all of the video frames and by triangulation, tries to identify the position of each marker in 3D space.

FIG. 21 is a photograph of an exemplary motion capture session. The three bright rings of light are rings of LEDs around the single lenses of the video cameras 2101-2103. The performers are wearing tight-fitting black suits. The gray dots on the suits are retroreflective markers that reflect the red LED light back to the camera lenses causing the markers to stand out brightly relative to the surrounding environment. Four such retroreflective markers on the knees of the left performer are identified as 2111-2114.

Because all of the markers look the same in a camera image, one of the challenges faced by mocap systems is determining which marker image corresponds to which marker (or markers) in the scene, and then tracking them frame-to-frame as the performers or props move. Typically, the performer stands roughly in a known position, with the markers placed in roughly known positions on the performer's body (or on a prop). The cameras all capture an initial frame, and the software is able to identify each marker because of the approximately known position of the performer and the markers on the performer. As the performer moves, the markers move in and out of the fields of view of the cameras, and often become obscured from the one, several or even all cameras as the performer moves around. This creates ambiguities in the mocap system's ability to continue to identify and track the markers.

For example, if a frame of a given video camera shows a marker centered at a given (x, y) pixel position, it is quite possible that the image is really showing two markers lined up one behind the other, leaving one completely obscured. In the next frame, the performer's motion may separate the markers to different (x, y) positions, but it can be difficult to determine which marker was the one in front and which was the one in back in the previous frame (e.g. the marker further away may appear slightly smaller, but the size difference may be less than the resolution of the camera can resolve). As another example, a performer may roll on the floor, obscuring all of the markers on one side. When the performer stands up, many markers suddenly appear in a camera's image and it may be difficult to identify which marker is which. A number of algorithms have been developed to improve this marker identification process, but it is still the case that in a typical motion capture session, human operators must "clean up" the captured data by manually correcting erroneous marker identification, frame-by-frame. Such work is tedious, time-consuming and adds to the cost of mocap production.

In one embodiment of the invention, single lens video cameras are replaced by video cameras utilizing coded lens techniques described herein. The coded lens cameras not only capture images of the markers, but they also capture the approximate depth of each marker. This improves the ability of the mocap system to identify markers in successive frames of capture. While a single lens camera only provides useful (x, y) position information of a marker, a coded lens camera provides (x, y, z) position information of a marker (as described above). For example, if one marker is initially in front of the other, and then in a subsequent frame the markers are separated, it is easy for the coded lens camera to identify which marker is closer and which is further away (i.e., using the z value). This information can then be correlated with the position of the markers in a previous frame before one was obscured behind the other, which identifies which marker is which, when both markers come into view.

Additionally, it is sometimes the case that one marker is only visible by one mocap camera, and it is obscured from all other mocap cameras (e.g. by the body of the performer). With a single lens mocap camera, it is not possible to triangulate with only one camera, and as such the markers (x, y, z) position can not be calculated. With a coded lens camera, however, the distance to the marker is known, and as a result, its (x, y, z) position can be easily calculated.

Using Range Information to Improve Robot Vision Systems

In another embodiment, coded lens cameras are used in robot vision systems. For example, in manufacturing applications a conventional lens camera can not provide distance information for a robotic armature to determine the (x, y, z) position of a part that it needs to pick up and insert in an assembly, but a coded lens camera can.

Using Increased Dynamic Range and (Distance) Range Information to Improve Security Camera Systems In one embodiment, coded lens cameras are employed within security systems. Because they have the ability to use low dynamic range sensors to capture high dynamic range scenes, they can provide usable imagery in situations where there is backlighting that would normally wash out the image in a conventional single lens camera. For example, if an intruder is entering a doorway, if there is bright daylight outside the doorway, a conventional single lens camera may not be able to resolve a useful image both outside the doorway and inside the doorway, whereas a coded lens camera can.

Embodiments of the invention may include various steps as set forth above. The steps may be embodied in machine-executable instructions which cause a general-purpose or special-purpose processor to perform certain steps. For example, the various operations described above may be software executed by a personal computer or embedded on a PCI card within a personal computer. Alternatively, or in addition, the operations may be implemented by a DSP or ASIC. Moreover, various components which are not relevant to the underlying principles of the invention such as computer memory, hard drive, input devices, etc, have been left out of the figures and description to avoid obscuring the pertinent aspects of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while the embodiments of the invention are described above in the context of a "camera," the underlying principles of the invention may be implemented within virtually any type of device including, but not limited to, PDA's, cellular telephones, and notebook computers. Accordingly, the scope and spirit of the present invention should be judged in terms of the claims which follow.

What is claimed is:

1. An apparatus for coding images comprising:
   a light-sensitive sensor configured to detect visible light representing a scene;
   a coded lens array including a plurality of lenses arranged in a first dimension and a second dimension and coupled together to form a two dimensional coded pattern cyclically repeated at least once in both dimensions;
   wherein the coded pattern is arranged to cause an overlapping of images projected from lenses onto the light-sensitive sensor;
   an analog to digital converter electrically coupled to the light sensitive sensor, the A/D converter to convert an analog signal representing visible light detected by the light-sensitive sensor to a digital signal; and
   an image reconstruction processor to process the digital signal and generate a reconstructed image of the scene, the reconstruction processor including program code and/or circuitry to compensate for the different levels of attenuation by adjusting intensity at different regions of the reconstructed image.

2. The apparatus as in claim 1 wherein the light-sensitive sensor is a light-sensitive semiconductor sensor coupled to the coded lens array and positioned at a specified distance behind the coded lens array, the light-sensitive sensor configured to sense light transmitted through the lenses in the coded lens array.

3. The apparatus as in claim 1 wherein the coded pattern is a Uniformly Redundant Array (URA) pattern.

4. The apparatus as in claim 1 wherein the coded pattern is a Modified Uniformly Redundant Array (MURA) pattern.

5. The apparatus as in claim 1 wherein the coded pattern is a random pattern.

6. The apparatus as in claim 1 wherein there is opaque material blocking array elements which do not contain lenses.

7. The apparatus as in claim 2 further comprising:
   an image sensor readout subsystem communicatively coupled to receive image data from the light-sensitive semiconductor sensor and to dynamically_adjust zero offset and/or gain of pixel values of the image data.

8. The apparatus as in claim 1 wherein the coded pattern is a Perfect Binary Array (PBA) pattern.

9. The apparatus as in claim 1 wherein adjusting intensity at different regions of the reconstructed image comprises multiplying each pixel of the reconstructed image by an inverse of a baffle attenuation value the pixel was subjected to.

10. The apparatus as in claim 1 wherein the light sensitive sensor is approximately ¼ the size of the coded lens array.

11. The apparatus as in claim 1 wherein the lenses within the coded lens array are plano-convex lenses.

12. The apparatus as in claim 1 wherein the image reconstruction processor further comprises: a noise-reducing smoothing filter having a filter characteristic adjusted for each pixel or each region of the reconstructed image according to signal-to-noise ratio variations within the reconstructed image.

13. The apparatus as in claim 1 wherein the light-sensitive sensor comprises a color filter array ("CFA") for capturing color images.

14. The apparatus as in claim 1 wherein the light-sensitive sensor comprises a multi-layer color image sensor.

15. The apparatus as in claim 1 further comprising:
   a plurality of baffles arranged in front of or behind each lens of the plurality of lenses to establish a maximum angle at which visible light of the scene can pass through the coded lens array and reach the light-sensitive sensor, the baffles causing baffle attenuation resulting in a different level of intensity of the visible light at different regions of the light-sensitive sensor, wherein each of the baffles comprise opaque material forming an apertures having a specified shape and size to establish the maximum angles at which the visible light from the scene can pass through the lens and reach the sensor.

16. The apparatus as in claim 15 wherein the aperture formed by each baffle are polygonally shaped.

17. The apparatus as in claim 15 wherein the plurality of baffles are formed out of a solid opaque material.

* * * * *